United States Patent [19]
Pfeifer et al.

[11] Patent Number: 6,087,815
[45] Date of Patent: Jul. 11, 2000

[54] PORTABLE POWER SYSTEM USING DC TO DC CONVERTER

[75] Inventors: John Edward Pfeifer, Redding, Conn.; James C. Boda, Merrimac; David M. Hoerr, Mazomanie, both of Wis.

[73] Assignee: Fiskars Inc., Madison, Wis.

[21] Appl. No.: 08/965,748

[22] Filed: Nov. 7, 1997

Related U.S. Application Data

[63] Continuation-in-part of application No. 08/842,062, Apr. 23, 1997.

[51] Int. Cl.[7] .................................................. G05F 1/44
[52] U.S. Cl. ........................................ 323/282; 323/351
[58] Field of Search ............................. 323/265, 268, 323/272, 282, 284, 350, 351, 283

[56] References Cited

U.S. PATENT DOCUMENTS

| | | |
|---|---|---|
| 1,530,342 | 3/1925 | Barber . |
| 3,274,476 | 9/1966 | Wildum . |
| 3,308,419 | 3/1967 | Rohowetz et al. . |
| 3,828,201 | 8/1974 | Allen, Sr. . |
| 3,919,615 | 11/1975 | Niecke . |
| 4,300,087 | 11/1981 | Meisner . |
| 4,389,704 | 6/1983 | Sasaki ........................ 363/62 |
| 4,524,412 | 6/1985 | Eng ............................ 363/58 |
| 4,578,772 | 3/1986 | Fujii .......................... 364/850 |
| 4,675,538 | 6/1987 | Epstein ....................... 307/64 |
| 4,748,344 | 5/1988 | Sing . |
| 5,019,767 | 5/1991 | Shirai et al. . |
| 5,021,727 | 6/1991 | Mashino ....................... 322/7 |
| 5,211,321 | 5/1993 | Rodriguez . |
| 5,450,003 | 9/1995 | Cheon ......................... 323/272 |
| 5,587,916 | 12/1996 | Martinson et al. ............. 364/483 |
| 5,656,876 | 8/1997 | Radley et al. ................ 307/150 |
| 5,808,884 | 9/1998 | Teggatz et al. ............... 363/98 |

OTHER PUBLICATIONS

High Efficiency, Synchronous, Step-down (Buck) Controllers—Integrated Circuits (Unitrode); Feb. 1996.

*Primary Examiner*—Adolf Deneke Berhane
*Attorney, Agent, or Firm*—Foley & Lardner; Jefferson Perkins

[57] ABSTRACT

A portable power system for a hand tool employs a high-voltage transmission of power from a battery pack over a cord to a DC to DC converter, which steps the transmission voltage down to rated tool voltage. The system uses a switching transistor to transmit power according to a duty cycle which varies automatically according to tool current draw and voltage. The DC to DC converter employs synchronous rectification with an inductor-capacitor network to transform a duty cycle square wave into DC power. The startup voltage sense feature permits powering up the converter circuitry only when needed. The converter will shut down if no current has been drawn by the tool for a predetermined period of time or if the converter unit is in danger of overheating, as determined by a stored algorithm. The portable power system has safeguards to prevent fouling or shorting in wet environments, is adaptable to left or right handed users, and is physically configurable into a variety of carrying modes.

11 Claims, 29 Drawing Sheets

INPUT VOLTAGE = 28.0 V
OUTPUT VOLTAGE = 13.8 V
OUTPUT CURRENT = 40.0 AMPS

INPUT VOLTAGE = 28.0 V
OUTPUT VOLTAGE = 13.8 V
OUTPUT CURRENT = 2.0 AMPS

INPUT VOLTAGE = 36.0 V
OUTPUT VOLTAGE = 13.8 V
OUTPUT CURRENT = 40.0 AMPS

INPUT VOLTAGE = 36.0 V
OUTPUT VOLTAGE = 13.8 V
OUTPUT CURRENT = 2.0 AMPS

INPUT VOLTAGE = 36.0 V
OUTPUT VOLTAGE = 13.8 V
OUTPUT CURRENT = 2.0 AMPS

INPUT VOLTAGE = 36.0 V
OUTPUT VOLTAGE = 13.8 V
OUTPUT CURRENT = 2.0 AMPS

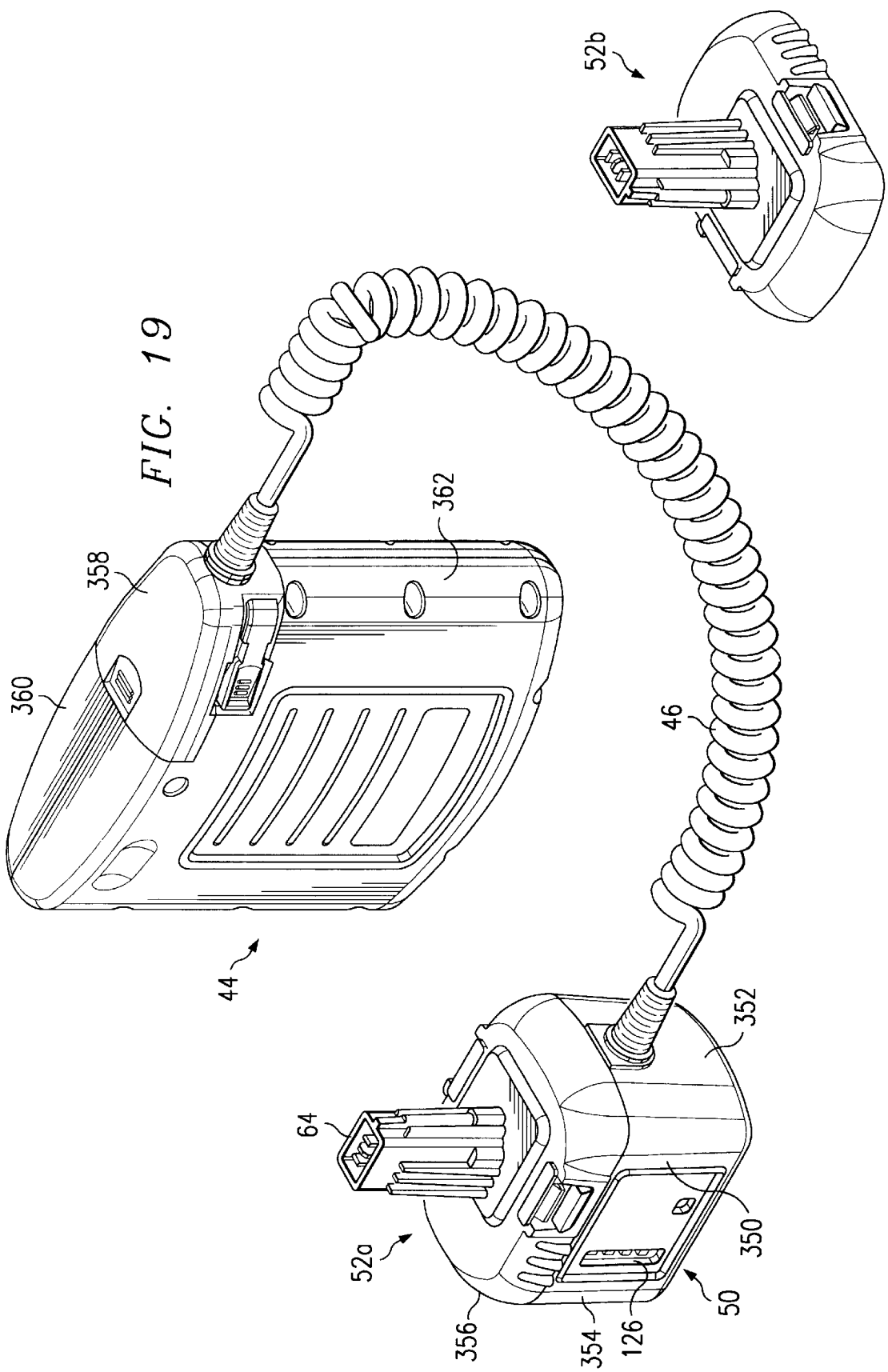

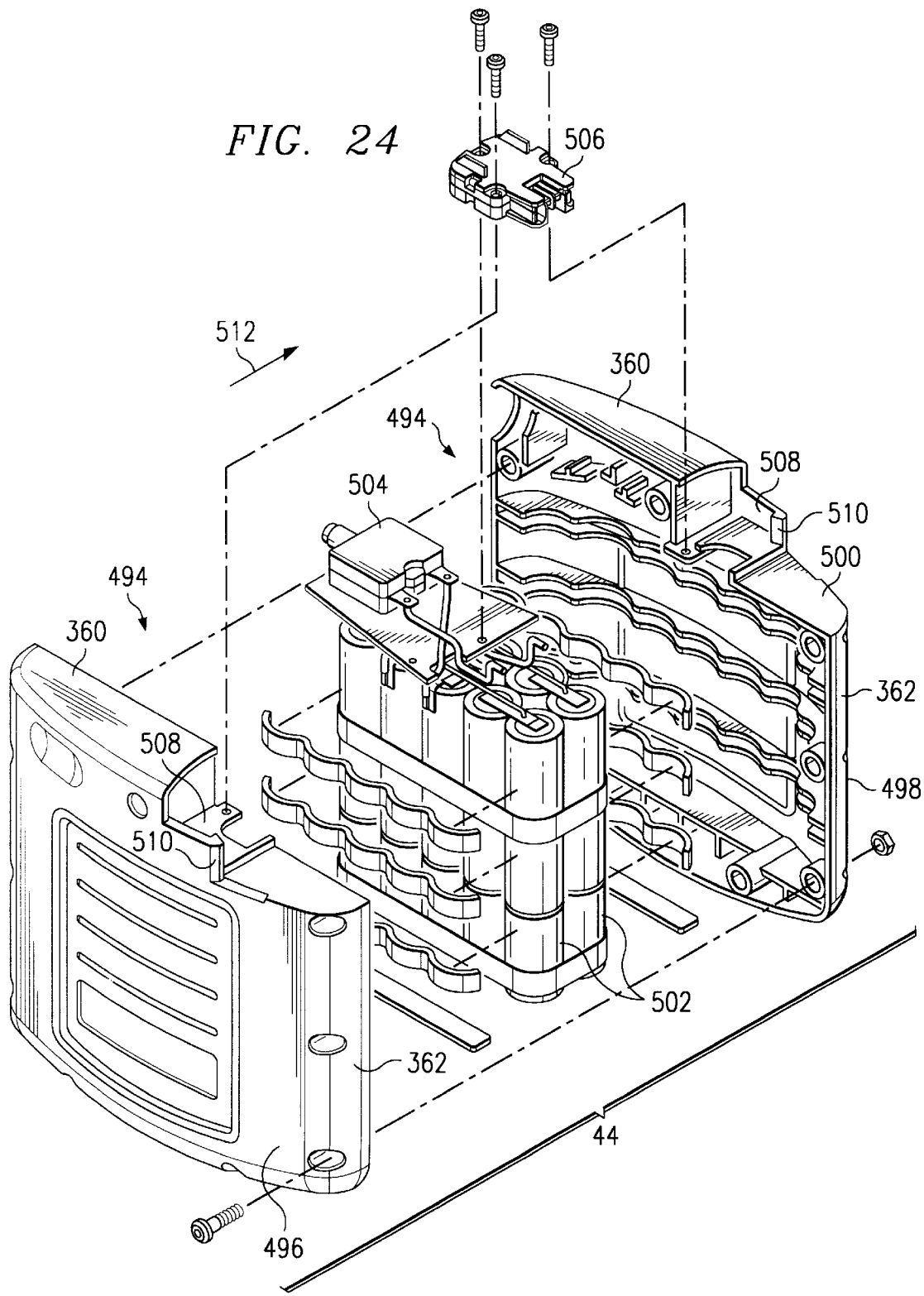

PORTABLE POWER SYSTEM USING DC TO DC CONVERTER

CROSS REFERENCE TO RELATED APPLICATIONS

The present application is a continuation in part of application Ser. No. 08/842,062, filed Apr. 23, 1997 (Attorney Docket No. 031890/1297), filed by the inventors hereof and assigned to Fiskars Inc., the assignee of this application. application Ser. No. 08/842,062 is fully incorporated into this application by reference.

TECHNICAL FIELD OF THE INVENTION

The present invention relates in general to battery-powered hand tools, and more particularly to a power system therefor which uses an operator-carried battery pack and a DC to DC converter proximate the hand tool.

BACKGROUND OF THE INVENTION

Conventional battery powered hand tools and other so-called "cordless" devices have self-contained power supplies. Current battery technology does not permit more than a modest stored energy to weight ratio; for their mass, batteries do not deliver very much power. Cordless hand tools, in order to have acceptable operational characteristics, have heavy batteries, and these in turn cause forearm fatigue. The power limitations on cordless devices have limited their use in professional and even homeowner applications. For example, drywallers do not use cordless drills in mounting drywall, as these are too heavy and do not deliver the torque that a 110V AC supplied "corded" drill will.

In order to surmount this problem, workers in the field have developed operator-carried battery packs that are connected to a hand-held tool by an electrical cord. Representative of such configurations are the battery and equipment vest by Rodriguez, U.S. Pat. No. 5,211,321; the battery belt shown in Sing, U.S. Pat. No. 4,748,344; and the battery belt shown in Niecke, U.S. Pat. No. 3,919,615. This last belt also includes an inverter to permit its use with AC powered tools.

While these inventions advantageously shift the weight of the batteries closer to the user, they do not address the power loss caused by the resistance of the electrical cord, which is large when the attached device is drawing a large electrical current. As a result of the voltage drop across the cord, the tool becomes powered at a voltage which is less than its rated voltage, thereby reducing the work which can be performed by the tool when it is most needed. Connections between the power source and the cord frequently create additional losses, compounding the problem. These losses also reduce the time during which the tool can be used before battery recharging is required.

One prior art solution to this problem is to have the power source deliver a voltage to the cord which is significantly higher than the rated voltage of the tool. The drawback of this approach is that under limited load conditions when the tool is drawing less current, the voltage drop across the cord will be less, and the voltage appearing at the tool will be more than the rated voltage. Such overvoltage conditions may cause damage to certain components of the tool, such as the variable speed trigger circuit found in most handheld drills.

A need therefore persists in the industry for methods and apparatus to overcome the voltage drop problem associated with placing the battery supply at a location distant from the tool.

SUMMARY OF THE INVENTION

According to one aspect of the invention, a portable power supply system for a hand tool has a DC to DC converter unit proximate the hand tool. The converter unit includes a conversion circuit which selectively gates power through a gate to an output thereof depending on a duty cycle dictated by the circuit. A trickle resistance bypasses the gate and is coupled to an output impedance; the current flowing through the trickle resistance also flows through the output impedance, causing a voltage to appear across the output impedance when the tool is not demanding power.

When the tool is switched on, the voltage across the output impedance drops significantly. An output voltage signal path is coupled back to the conversion circuit, which then will switch on to satisfy the demand for power from the tool. In this fashion, the conversion circuit can exist in a standby state with minimal power consumption until the tool itself is switched on.

According to another aspect of the invention, the conversion circuit is controlled by a controller such as a microcontroller or a microprocessor. A current sense circuit is coupled to the output of the conversion circuit, and a current sense signal path sends a signal which is related to the current drawn by the tool. The controller will permit the conversion circuit to supply power to the output thereof only for so long as a potential overheating condition does not exist. This in turn is determined by the controller by a predetermined algorithm which determines whether or not the conversion circuit ought to be turned on as a function of the current value taken over time. Higher currents produce more heat, while smaller currents produce less heat, and even smaller currents produce an amount of heat which is less than the ability of the circuit to dissipate, permitting cooling of the tool and indefinite operation at those levels.

In a preferred embodiment, the controller includes an accumulator which accumulates counts. The current sense signal path is periodically inspected and, at predetermined intervals, the controller adds or subtracts counts as a predetermined function of the current level. When the accumulator exceeds a predetermined sum, the conversion circuit is effectively turned off, allowing the power supply system to cool.

In a further aspect of the invention, a converter circuit of the system is coupled to a DC power supply for power, itself coupled back to the battery input voltage. Under an "off" or a standby state, the DC power supply is cut off from the batteries, shutting down delivery of power to the conversion circuit and thereby conserving battery power.

In yet another aspect of the invention, a controller of the conversion circuit senses when no power has been drawn by the tool for a predetermined period of time, and cuts off power to the conversion circuit to enter into an idle or standby state.

In a still further aspect of the invention, the conversion circuit has a current sense feature which senses large amounts of current drawn by the tool, indicative of a very high current or shorting condition; in response to sensing large amounts of drawn current, the conversion circuit will greatly reduce the duty cycle and therefore the output voltage.

In another aspect of the invention, a tool adapter, which is provided for one particular tool, is mateable with a converter unit, provided for any of a plurality of different adapters. In essence, the adapter acts as a transition member between the converter unit and the tool, both physically and electrically.

As used for a battery-powered drill, for example, the converter unit is disposed beneath the adapter unit, itself mated to the tool handle. The converter unit has a set of electrical contacts which are elevated above a general top, flat surface of the converter unit, thereby preventing fouling and shorting out across these contacts in inclement weather conditions or wet environments. The adapter also preferably includes a voltage selector circuit, such as a resistor of a predetermined value, which is recognizable by the converter circuit as an indication of the DC power level to be delivered by the converter circuit to the tool. Different resistances sensed by the controller circuit will result in different levels of DC output voltage.

In another, mechanical aspect of the invention, certain spring-loaded metal contacts have been bifurcated to increase the effective contact surface area, and therefore reduce the contact resistance.

In a further aspect of the invention, a pair of stops or prongs are provided at one end of the adapter to force the operator into connecting the adapter unit to the adapter in the right way. Particularly, the downwardly disposed end stops will permit relative sliding motion in one direction to couple together the adapter and the converter, as intended, and will prevent such sliding motion in the opposite direction where the operator is attempting to achieve connection.

In another aspect of the invention, a battery pack connector is mounted at a corner of the battery pack, and the battery pack is made to be substantially bilaterally symmetrical about a plane parallel to the operator's back. This permits the user to switch the connector from the right shoulder to the left, placing the connector in a good physical relationship with the hand holding the tool, regardless of which hand this is.

To enhance the utility of the portable system, a battery pouch has been devised which may be used on a belt, as a portion of a backpack or in a "saddlebag" configuration with a power tool holster.

BRIEF DESCRIPTION OF THE DRAWINGS

Further aspects of the invention and their advantages will be discerned in the following detailed description when read together with the drawings, in which like characters denote like parts and in which:

FIG. 19 is a perspective view of a second embodiment of a mobile power supply system for a hand tool according to the invention;

FIG. 20b is a bottom plan view of the adapter shown in FIG. 20a;

FIG. 20c is an end elevational view of the adapter shown in FIG. 20a;

FIG. 21b is an isometric view from a lower vantage point of the contact plate subassembly shown in FIG. 21a;

FIG. 22b is an exploded isometric view of the converter unit shown in FIG. 22a;

FIG. 23b is a side view of the cord and connector shown in FIG. 23a;

FIG. 24 is an exploded isometric view of a battery pack according to the second embodiment of the invention;

FIG. 27b is a perspective rear view of the battery pouch shown in FIG. 27a;

FIG. 28b is a front perspective view of the backpack adapter shown in FIG. 28a;

FIG. 30b is a front perspective view of the hand tool holster shown in FIG. 30a;

DETAILED DESCRIPTION OF ILLUSTRATED EMBODIMENT

Figure 1:
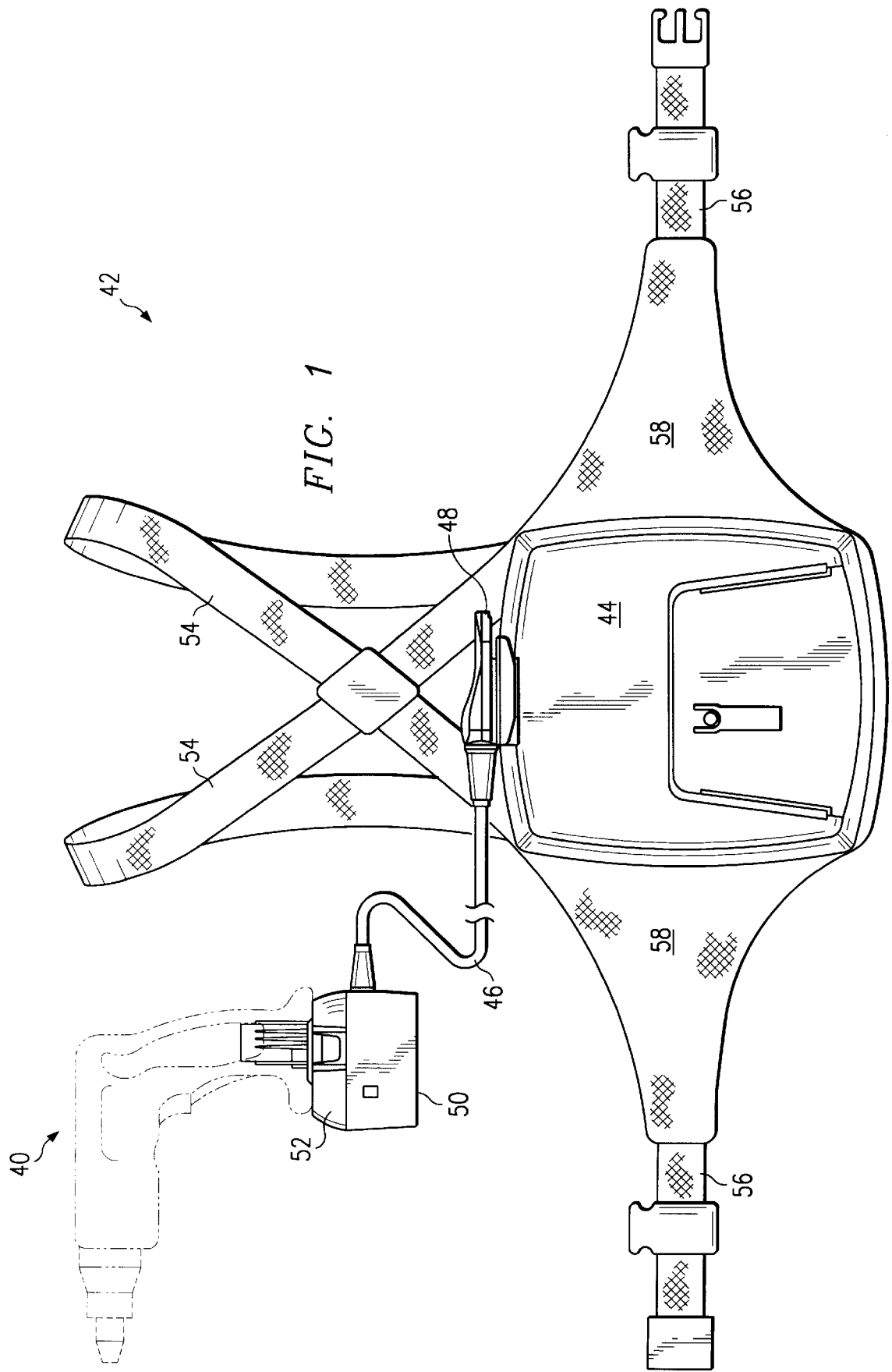
FIG. 1 is an elevational view of a first embodiment of a portable hand tool power supply system according to the invention, a battery-powered drill being shown in phantom.

In FIG. 1, a hand-held tool 40, in the illustrated embodiment a drill, is supplied with power from a portable power system indicated generally at 42. The portable power system includes a battery pack 44, a power cord 46, a connector 48 connecting the cord 46 with the battery pack 44, a converter unit 50 at the other end of the cord 46 from the battery pack 44, and an adapter 52 which fits on the converter unit 50 and which inserts into a battery cavity of the normally battery-powered hand tool 40.

In this embodiment, the battery pack 44 is supported on the back of the tool operator by means of a pair of shoulder straps 54. Some of the weight of the pack 44 is transferred to the pelvis of the operator by the use of a belt 56. In the embodiment illustrated in FIG. 1, webs 58 connect respective sides of the battery pack 44 to segments of the belt 56, so as to minimize movement of the pack 44 with respect to the back of the wearer.

The connector 48 is located at a central top location on the battery pack 44. This forms a connection point which is as convenient to a tool held in the left hand as it is for one held in the right hand.

The adapter 52 and the converter unit 50 are attached to the tool 40 so as to aid in its balance. In the instance of a drill powered directly by a 110V cord, a large amount of the weight of the tool is forward of the hand, producing a downward bending moment on the wrist of the user. This bending moment may be reduced by positioning the center of gravity of the adapter 52 and converter unit 50 forward of the tool handle.

The adapter 52 is custom-provided for a particular make of tool, having contacts, a battery cavity size and latching mechanisms which may differ from adapters for other makes and types of tools. Other adapters are made to fit with other respective tool types and makes. The converter unit, however, is used with all of the various adapters fashioned for these tool types and makes, even where, as will be explained below, the DC voltage design criteria of the various hand tools differ one from another. The illustrated tool is a DeWalt drill having a nominal voltage of 12V DC, but actually designed for the full charge voltage of ten NiCd batteries, which is 13.8V DC. The system may be supplied with adapters for other drill makes, or other battery-operated tools, such as clippers, tree-trimmers, saws, string trimmers, lights and just about any other portable battery-powered appliance.

Figure 2:
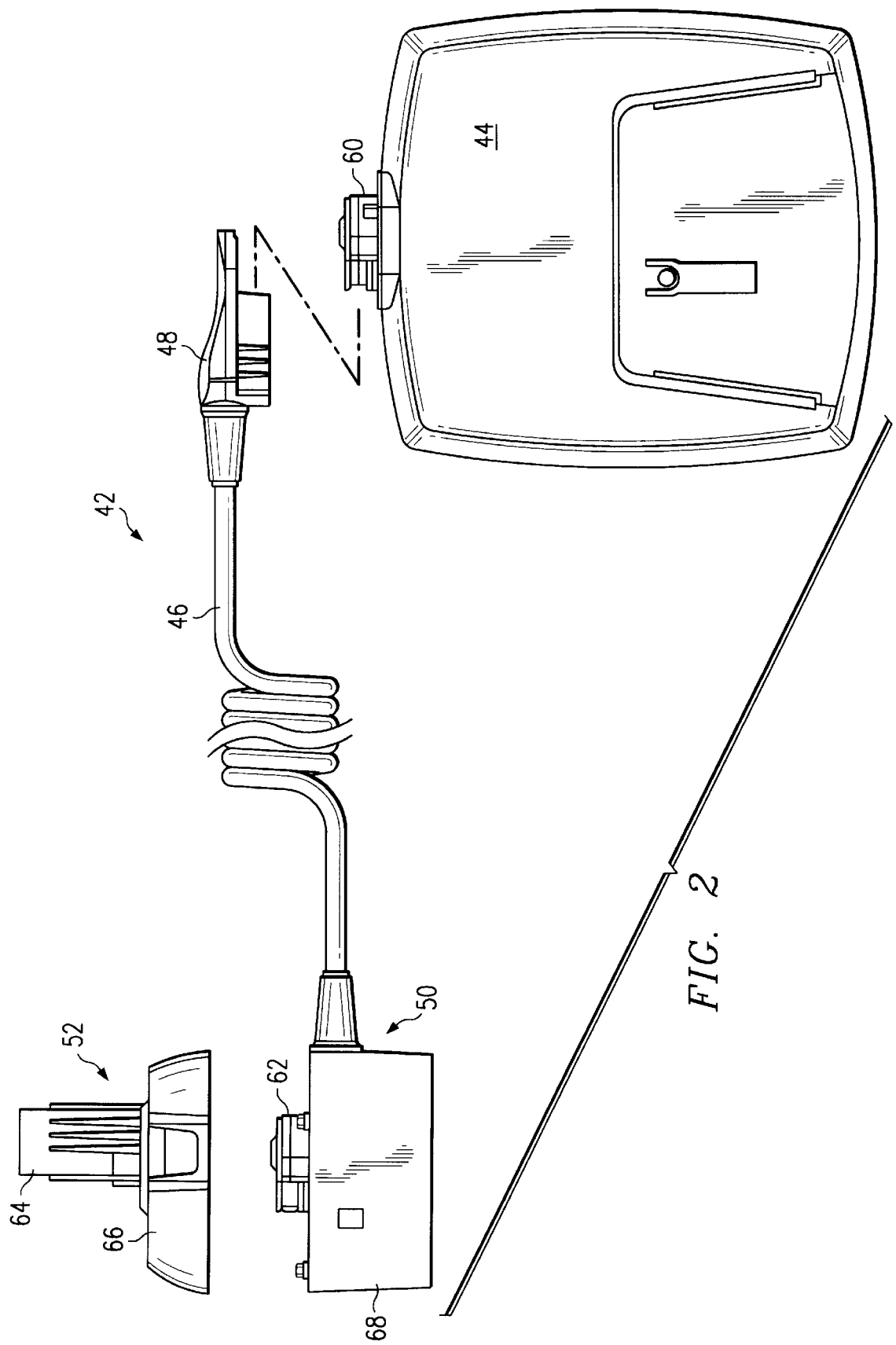
FIG. 2 is an exploded elevational view of an adapter, converter unit, cord, connector and battery forming components of the first embodiment of the invention.

Referring next to FIG. 2, the connector 48 slidably attaches to a socket 60 on the top of the battery pack 44, using one or more mechanical detents or fasteners to prevent inadvertent disconnection. The converter unit 50 has an upper socket 62 by which it is physically and electrically attached to the adapter 52. The adapter 52 has two physical components: an insert 64 which fits into the battery cavity of the tool normally occupied by batteries, as above explained, and a base 66 which forms a transition between the tool handle and the sidewalls 68 of the converter unit 50.

Figure 3:
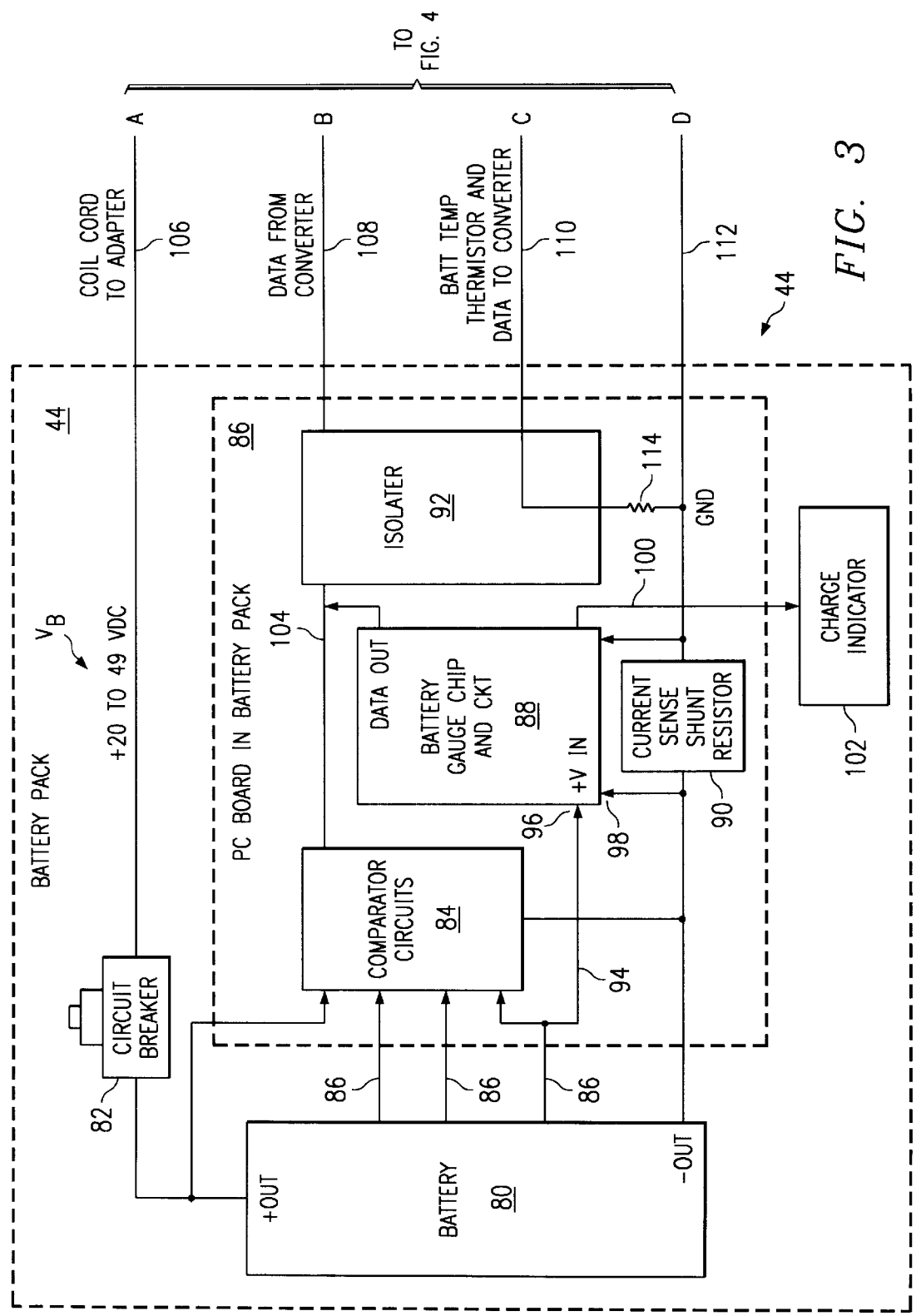
FIG. 3 is a high-level schematic diagram of a battery pack circuit according to the invention.

FIG. 3 is a high-level block diagram of the circuits in battery pack 44. The battery cells themselves are indicated schematically at 80, and are connected together in series. A positive terminal of the batteries 80 is connected to a circuit breaker 82 as well as a comparator circuit block 84. The battery pack 80 may contain from twenty-four to thirty-six sub "C" cells, with taps 86 occurring at each of a predetermined number of cell groups, such as every six cells. These taps are also connected to the comparator block 84. Circuits within comparator circuit block 84 sense the voltages across individual cell groups.

The comparator circuit 84 is mounted on a printed circuit board 86 together with a data out and battery gauge chip and circuit 88, a shunt 90 and an optical isolator circuit 92. A cell tap line 94 connects the positive side of the lowest six-cell section of the battery pack 80 to a power input 96 of the circuit 88. The negative terminal of the battery pack 80 is connected to the comparator circuits 84, a negative terminal 98 of the battery gauge circuit 88, and the shunt 90. A display output line 100 connects the battery gauge circuit 88 to an off-board charge indicator 102, which may be composed of individual LEDs shining through respective battery case orifices to indicate a state of charge of the battery pack 80. A line 104 connects the comparator circuit 84 with the optical isolator circuit 92 and the battery gauge circuit 88.

Four lines are incorporated into the coil cord 46 (FIG. 2): a positive power line 106 which is at between 20 and 49 volts DC, inclusive, although other output voltages could be selected, and which is dependent on the number and type of cells in battery pack 80 and their state of charge; a data line 108 to the converter (described below) from the isolator circuit 92; a battery temperature thermistor and data line 110 to the converter unit; and a negative power line 112. A thermistor 114 is physically disposed next to the batteries 80 and is connected between line 110 and line 112.

Figure 4:
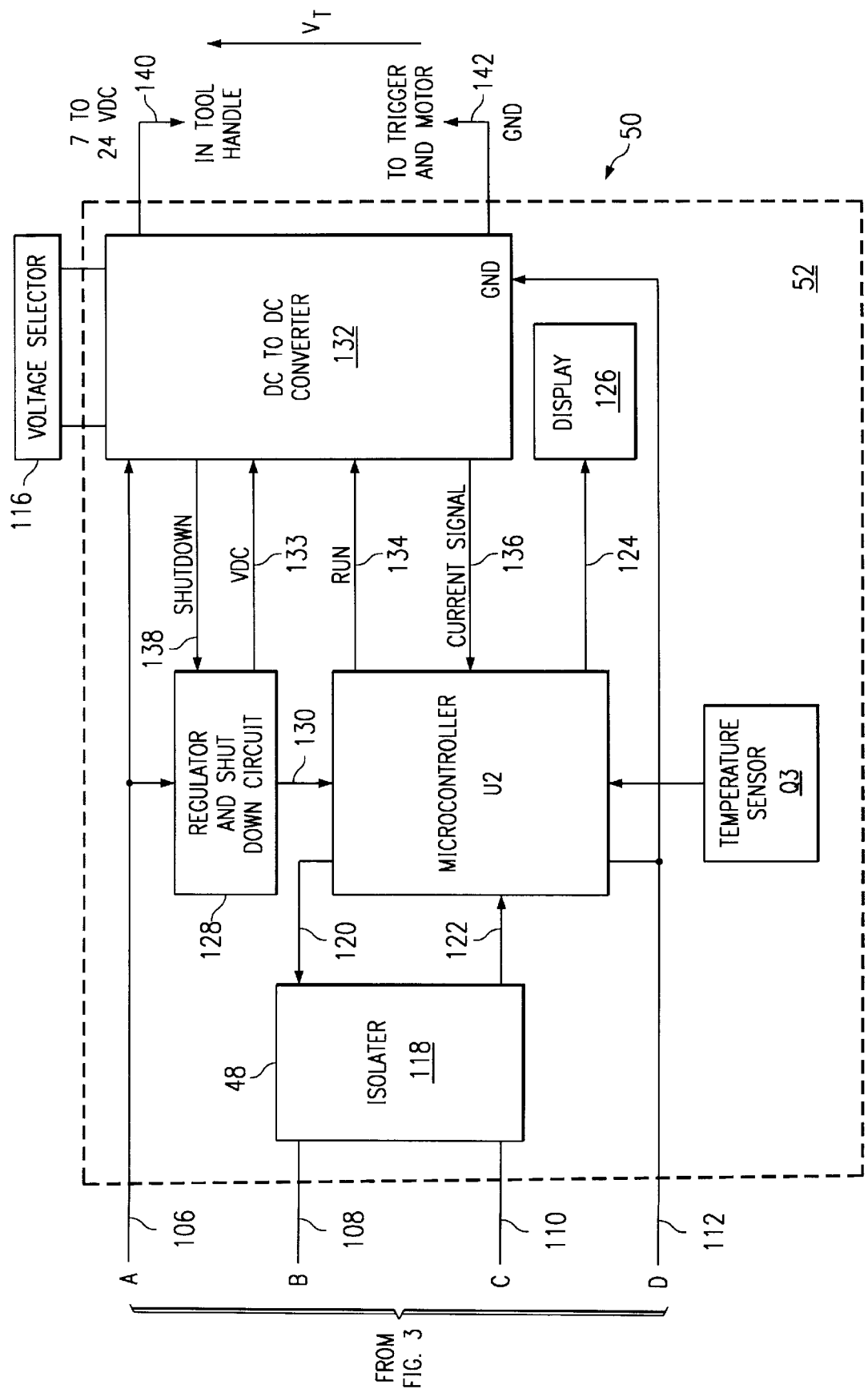
FIG. 4 is a high-level schematic diagram of a converter unit circuit according to the invention.

FIG. 4 is a high-level schematic diagram of the circuitry proximate the tool, which circuitry resides within the converter unit 52 except for a voltage selector circuit 116 that is installed within the adapter 52. Data lines 108 and 110 are connected to an isolator circuit 118, which in turn is connected via lines 120 and 122 to a microcontroller U2. The microcontroller U2 receives an input from a temperature sensor Q3 and sends a display output on a display output path 124 to a display unit 126. A voltage regulator and shutdown circuit 128 receives DC power from the positive power input line 106 and supplies operating power to the controller U2, such as 12 volts DC, via line 130 and to conversion circuit 132 via a line 133. The controller U2 is connected to a DC to DC conversion circuit 132 through a "RUN" signal path 134, and receives a current sense signal on line 136 which is indicative of the output current which the conversion circuit 132 is producing. A shutdown signal path 138 permits the DC to DC converter to shut off power otherwise provided by power supply circuit 128 to microcontroller 130. links the conversion circuit to the voltage regulator and shutdown circuit 128.

The conversion circuit 132 senses the appropriate hand tool output voltage by sensing the voltage appearing across a voltage selector circuit 116, and outputs DC power at output port 140 accordingly. Ground line 112 connects to the controller U2 and the conversion circuit 132, and supplies a ground connection to the hand tool at 142.

Figure 5A:
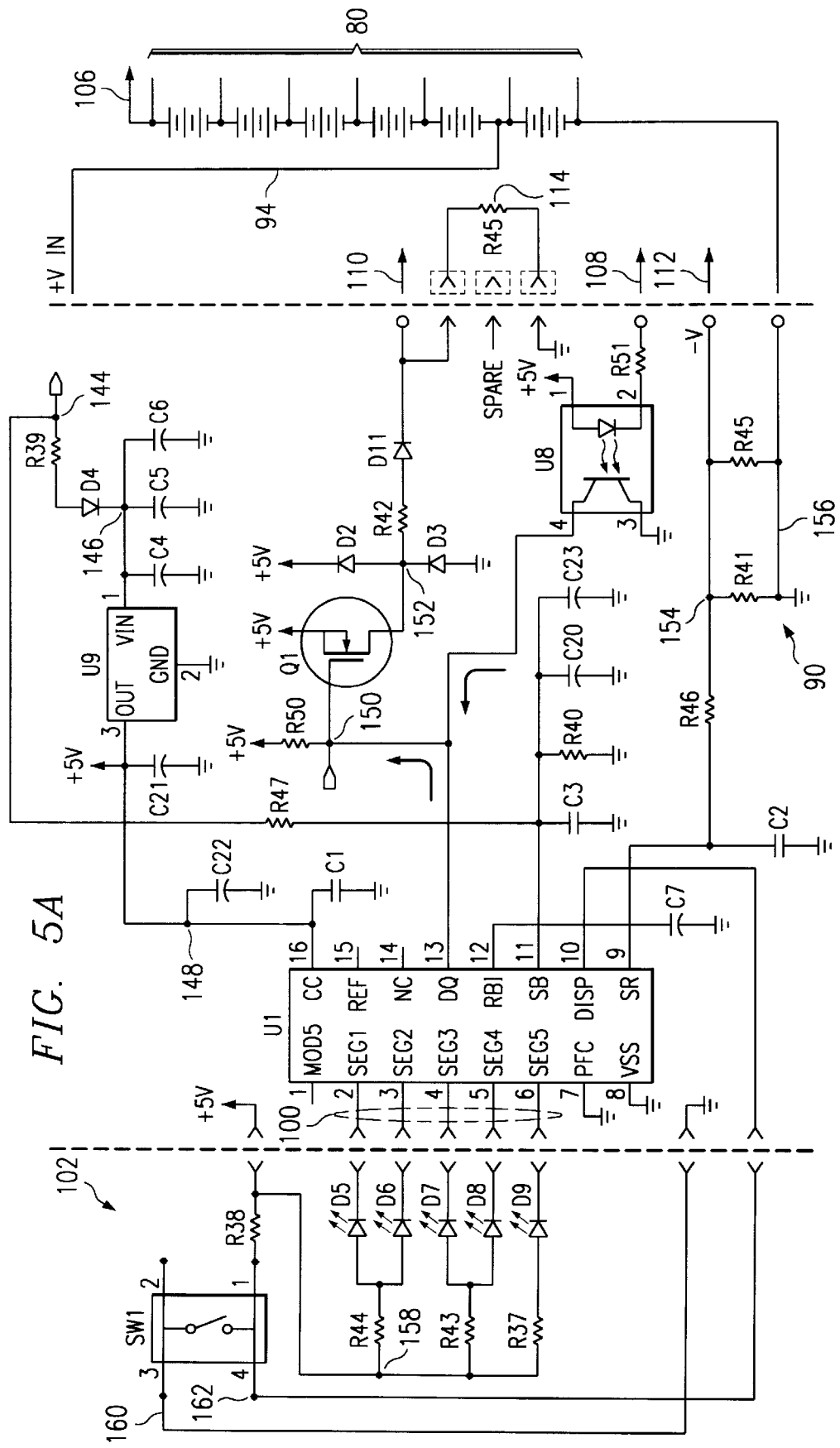
FIG. 5a is a detailed electrical schematic diagram of a first embodiment of a battery pack circuit according to the invention.

FIG. 5a illustrates one embodiment of the circuitry inside battery pack 44. This embodiment is built around an integrated "battery gauge" circuit U1, which can be a Benchmarq™ BQ2011 integrated circuit. In this embodiment, the battery stack 80 consists of twenty-four to thirty-six Sub C cells. A tap 94 connects to the positive side of the bottom six cells, supplying 5.4 to 9.1 volts. The tap 94 is connected to a node 144, to which is connected a noise filter consisting of a resistor R39 having one end connected to the node 144, a diode D4 having an anode connected to the other end of the resistor R39 and a cathode connected to a node 146, and a bank of capacitors C4, C5 and C6 connected in parallel between node 146 and ground.

Node 146 is further connected to a VIN port of a five-volt voltage regulator chip U9. A second terminal of the voltage regulator chip U9 is grounded, while a third output port is connected to a node 148; node 148 serves as a 5V DC power supply. Capacitors C21 and C22 are respectively connected between node 148 and ground at locations proximate the regulator U9 and the battery gauge chip U1, respectively. Node 148 is connected to a power supply pin 16 of battery gauge circuit U1 to supply VCC=5V thereto.

The DATA IN terminal 108 is coupled to a data pin 13 of the battery gauge chip U1 through an optical isolation circuit consisting of a resistor R51 and an optical isolator chip U8. The data pin 13 of chip U1 is further connected to a node 150, which in turn is connected to a gate of a field-effect transistor Q1.

A resistor R50 connects node 150 to the 5 volt power supply, which is derived from node 148. The P-channel FET Q1 has a source connected to the 5 volt power supply and a drain connected to a node 152. A cathode of a diode D3 is connected to node 152, while an anode thereof is connected to ground. An anode of a diode D2 is connected to node 152 while a cathode thereof is connected to the 5 volt power supply. Node 152 is connected via a resistor R42 to the anode of a diode D11, the cathode of which is connected to DATA OUT communications line 110.

As a noise filter, a capacitor C7 is connected between pin 12 of circuit U1 and ground. Pin 16 of chip U1 is connected to ground via a capacitor C1. Pin 11 of chip U1 is connected to ground via a capacitor C3 and a resistor R40, as well as a capacitor C20 and a capacitor C23. A resistor R47 connects pin 11 to node 144. Pins 7 and 8 of chip U1 are grounded.

A capacitor C2 is connected between pin 9 of chip U1 and ground. A resistor R46 connects pin 9 of chip U1 to a node 154, which is connected to negative output lead 112. Shunt resistors R41 and R45 connect node 154 to a node 156, which is connected to ground and to the bottom of the battery stack 80. The shunt resistors R41 and R45 are used for current sensing.

Pins 2–6 of the battery gauge circuit U1 are connected to the cathodes of respective light-emitting diodes D5, D6, D7, D8 and D9. The anodes of light emitting diodes D5 and D6 are connected by a resistor R44 to a node 158. In a similar fashion, the anodes of light emitting diodes D7 and D8 are connected via a resistor R43 to the node 158. Finally, LED D9 has its anode connected via resistor R37 to node 158. Node 158 is in turn connected via a resistor R38 to an LED switch SW1. A terminal 160 of LED switch SW1 is connected to ground, while a terminal 162 is connected to pin 10 of battery gauge chip U1. The LED display circuit 102 is optional and may, in certain embodiments, be omitted.

Figure 5B:
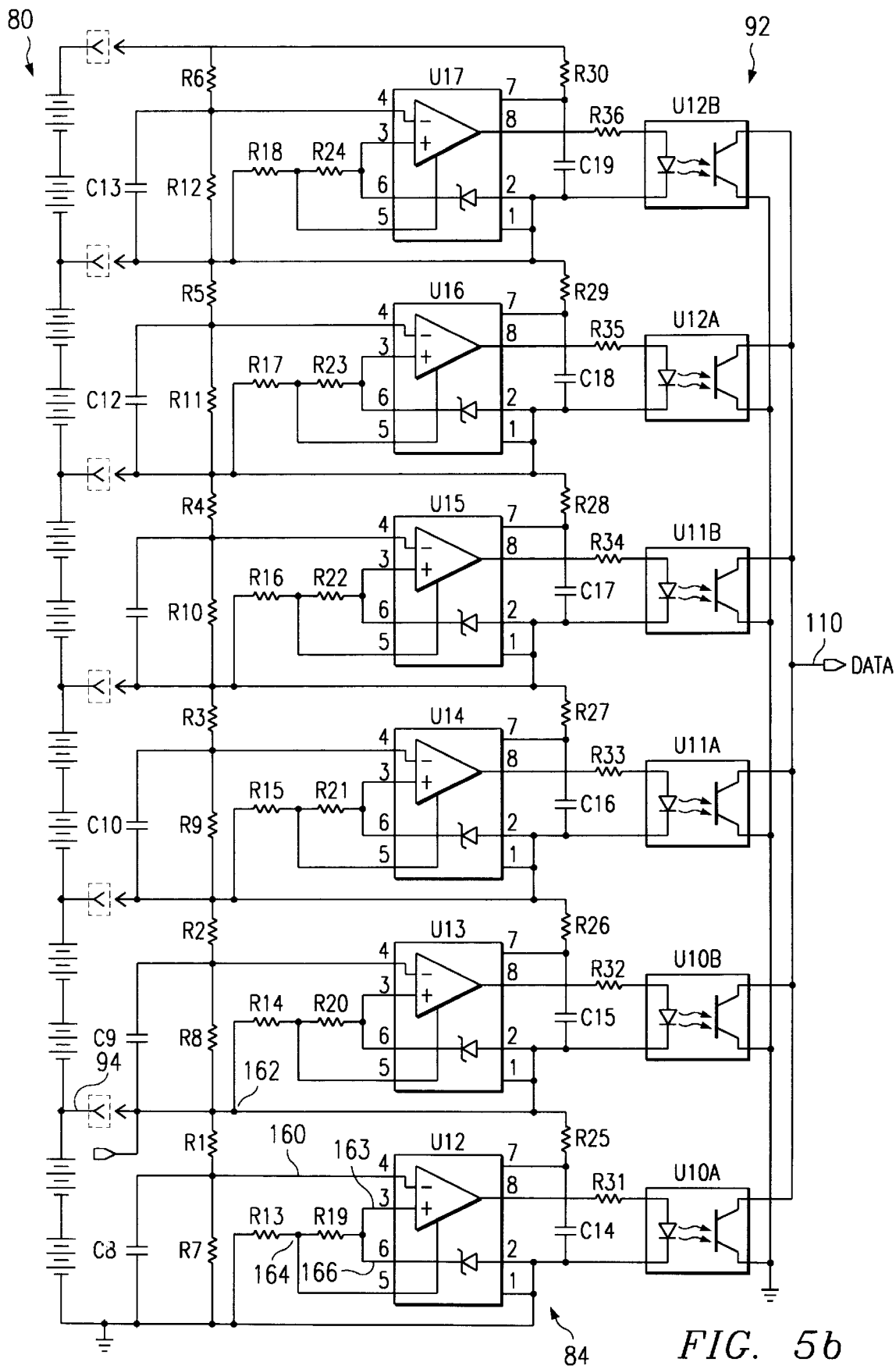
FIG. 5b is a detailed electrical schematic diagram of a second embodiment of a battery pack circuit according to the invention.

FIG. 5B shows an alternative embodiment of the circuitry inside battery pack 44. In this embodiment, the comparator circuit block 84 comprises a set of voltage comparators U12, U13, U14, U15, U16 and U17, one for each section of six battery cells. Taken as an example, the bottommost comparator U12 has a first lead or node 160 connected by a large-resistance resistor R1 to a node 162 in the stage above it. Node 160 is further connected by a capacitor C8 to ground, and also by a resistor R7 to ground. A second terminal or node 163 is connected via a resistor R19 to a hysteresis node 164 that is in turn connected back to a further terminal of the comparator U12. Node 162 is also connected to a reference terminal 166. Pins 1 and 2 of the comparator U12 are grounded while pin 7 is connected through a resistor R25 to node 162. Pin 7 of comparator U12 is also connected to pin 2 of comparator U12 via a capacitor C14. Output pin 8 of the comparator U12 is connected via a resistor R31 to an input terminal of optical isolator unit U10a. A second terminal of the optical isolator U10a is connected to pin 2 of comparator U12. On the output side of the optical isolator unit U10a, pin 8 thereof is connected to the DATA OUT line 110, while pin 7 thereof is connected to ground. Node 162 is connected to tap 94 of the battery stack 80.

The other stages are similarly connected. Each one of the comparators U13–U17 has a corresponding optical isolator unit U10b, U11a, U11b, U12a or U12b, respectively. Each of the comparator circuits U13–U17 corresponds to a different stack of cells within battery stack 80. The stages in which comparators U16 and U17 and optical isolator unit U12a and U12b are used are only employed in the instance where more than 24 cells are used. Comparator U16 and optical isolator unit U12a, and associated components, are used where there are 30 cells, and comparator U17 and optical isolator unit U12b are used where there are a total of 36 cells. For stacks having more cells than this, further comparator units, optical isolator units and associated resistors and capacitors are added as further stages (not shown).

In operation of the circuit illustrated in FIG. 5b, each comparator U12–U17 monitors a respectively 6-cell section of the cell stack 80. If a group of six cells falls below 5.4 volts, the comparator will turn on the optical coupler unit with which it is associated. If the data line 110 goes low, this signals the DC—DC converter circuit (described below) to shut down, prohibiting further discharge.

Figure 6A:
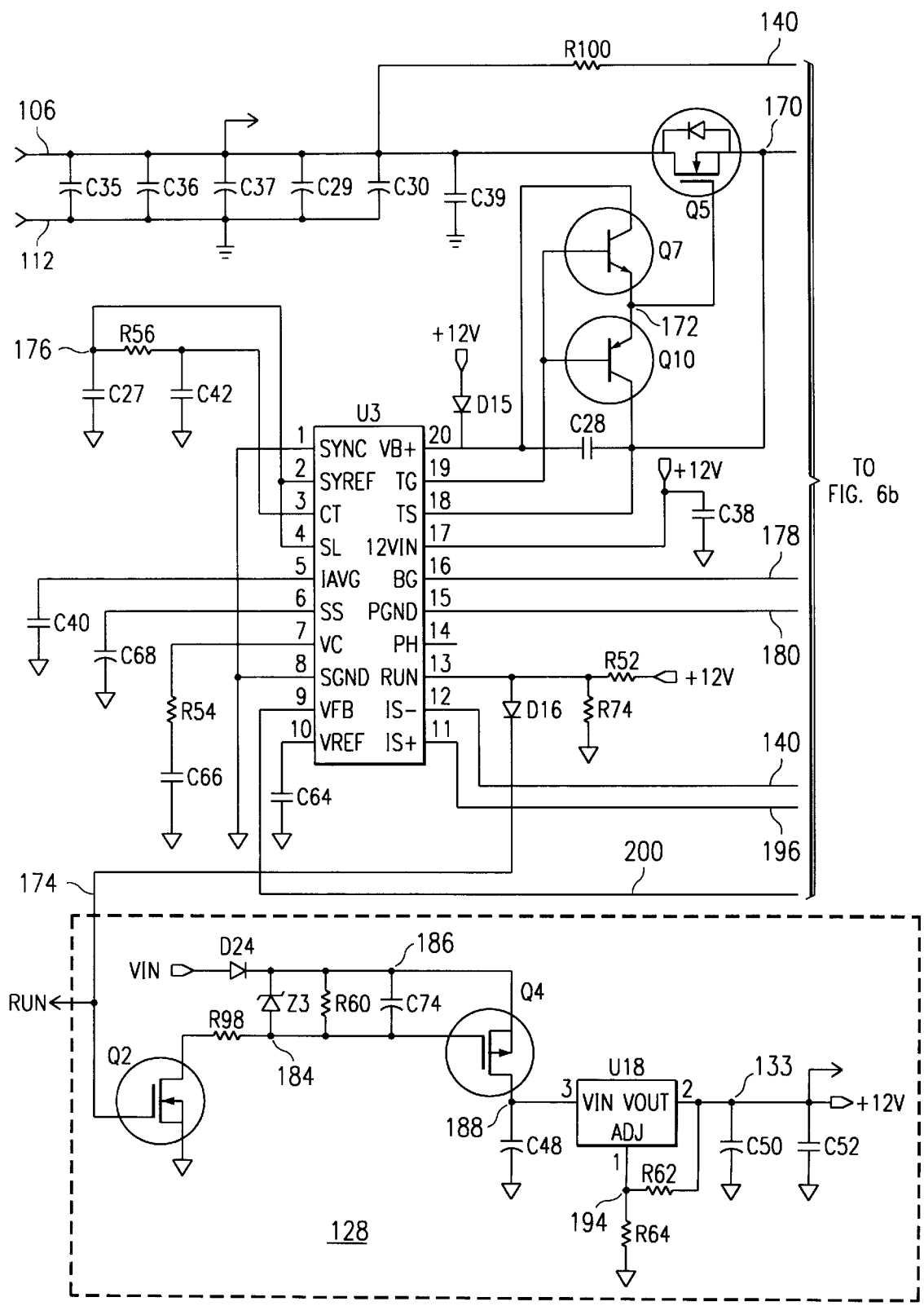
FIG. 6 is a detailed electrical schematic diagram of converter, voltage selector, voltage regulator, shut down circuit and isolator circuits used in a preferred embodiment of the invention.
Figure 6B:
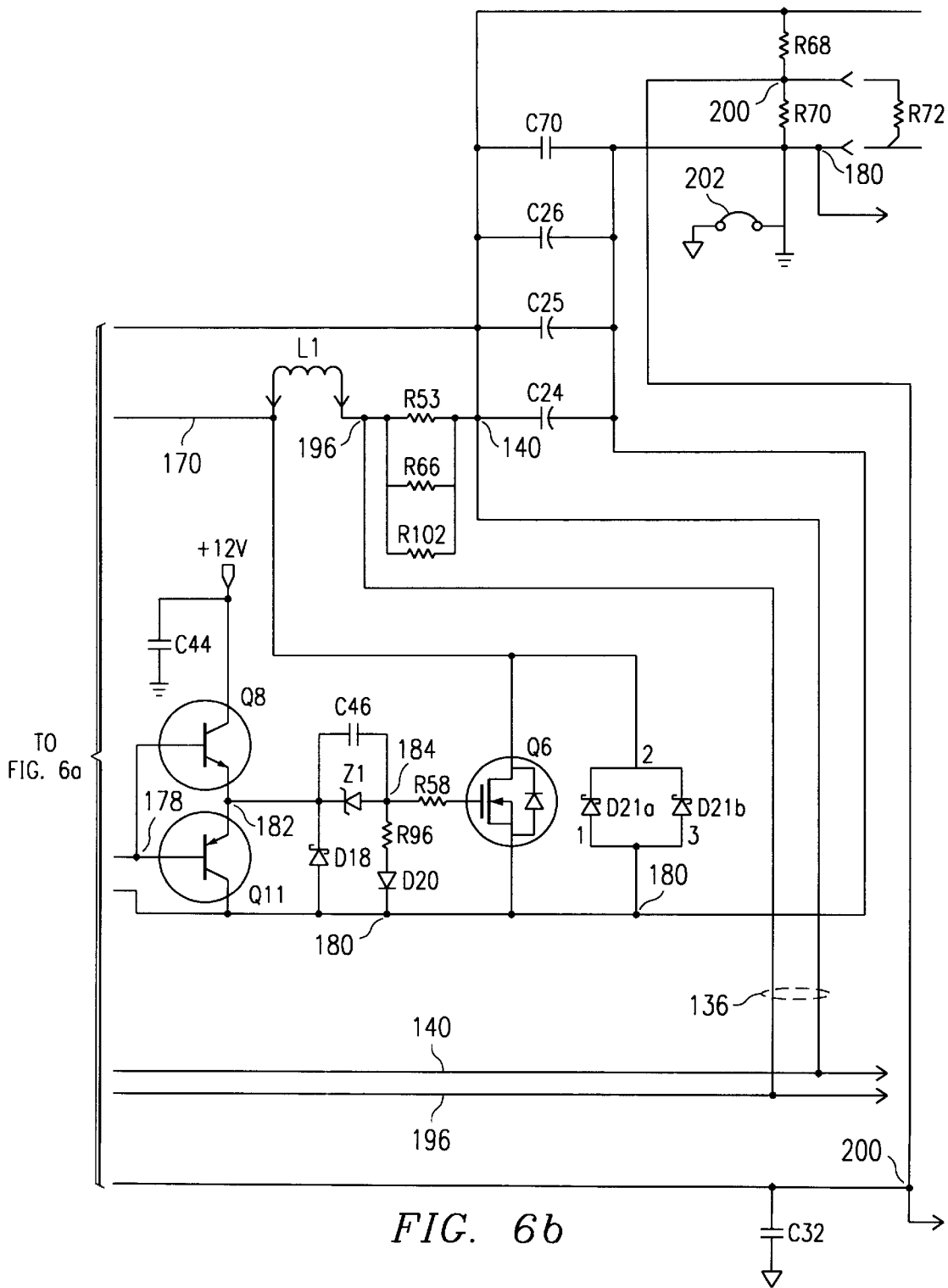

Referring next to FIG. 6, the conversion circuit and associated circuitry are shown in more detail. A capacitor bank composed of capacitors C35, C36, C37, C29 and C30 connects the positive power lead 106 to the negative power lead 112 to provide protection from voltage fluctuations. A capacitor C39 connects positive power lead 106 to ground. The positive power lead 106 terminates at a drain of a high-power n-channel field effect transistor Q5. A source of the transistor Q5 is connected to a node 170, which in turn is connected to a first end of a large inductor L1. Node 170 is also connected to a collector of an npn bipolar switching transistor Q10, to one side of a capacitor C28, and to a pin 18 of a pulse width modulating converter integrated circuit U3, which can be an LT 1339 made by Linear Technology Inc.

A gate of the FET Q5 is connected to a node 172, which in turn is connected to an emitter of a npn bipolar transistor Q7 and an emitter of the pnp bipolar transistor Q10. A collector of transistor Q7 is connected to a 12 volt DC power supply for the board on which the conversion circuit is assembled (see power supply 128) through a diode D15, and is also connected to a VB+ pin 20 of integrated circuit U3 and to the other side of capacitor C28. The bases of transistors Q7 and Q10 are connected in common to a TG pin 19 of IC U3.

The converter circuit U3 turns one of the bipolar transistors Q7 and Q10 on while turning the other one off. Where transistor Q7 is turned on, charge from the 12V power supply will accumulate on node 172 and therefore on the gate of FET Q5, permitting transmission of current from line 106 to node 170. At this time transistor Q10, whose base experiences the same voltage as the base of transistor Q7, will be turned off. When the voltage on pin 19 changes by a sufficient amount, transistor Q7 will be turned off while transistor Q10 is turned on, draining charge from node 172 and the gate of FET Q5, thereby interrupting power transmission from positive power line 106.

The on-board 12V DC power supply 128 supplies power to circuit U3 via pin 17 thereof. Pin 17 is also connected to ground via a capacitor C38. The 12V DC power supply is also connected to RUN pin 13 of IC U3 via a resistor R52. Pin 13 of circuit U3 is connected to ground via a resistor R74. A diode D16 connects the RUN pin 13 to a RUN command line 174 and to the gate of field effect transistor Q2, which is a portion of the voltage regulator and power supply circuit 128. Converter circuit U3 will operate in normal fashion as long as the voltage on RUN pin 13 is high, but when the voltage on RUN pin 13 is pulled low, logic circuit U3 will pull the bases of transistors Q7 and Q10 low, deenergizing the gate of FET Q5 and cutting off power. When RUN line 174 is high, logic circuit U3 will turn transistor Q5 on and off at a frequency of about 100 KHz, at a duty cycle sufficient to transmit an amount of charge that will result in a predetermined amount of current at or near the indicated tool voltage (such as 13.8V), on the output 140 of the conversion circuit.

A voltage reference pin 10 of the logic circuit U3 is connected to ground via a capacitor C64. A voltage sense line 200 is connected to pin 9 of the circuit U3. Pins 1 and 8 of the circuit U3 are grounded. Pin 7 of the logic circuit U3 is connected via a resistor R54 and a capacitor C66 to ground. Pin 6 of circuit U3 is connected through a capacitor C68 to ground to set the "softstart" timing. Pin 5 is connected to ground via a capacitor C40. Pins 2 and 4 of circuit U3 are connected in common to a reference node 176, which in turn is connected to ground via a capacitor C27 and to pin 3 through a resistor R56. Pin 3 of circuit U3 is also connected to ground through a capacitor C42; Capacitor C42 and resistor R56 together provide an RC time constant used by the circuit U3 to determine its frequency of oscillation.

Pin 16 of circuit U3 is connected to a node 178, which in turn is connected to the bases of a bipolar transistor pair: npn bipolar transistor Q8 and pnp bipolar transistor Q11. A collector of transistor Q11 is connected to a node 180, which in turn is connected to pin 15 of circuit U3. Node 180 is further connected to an anode of a Schottky diode D18 and the cathode of a diode D20.

The 12-volt power supply (from circuit 128) is connected to a collector of transistor Q8. The collector of transistor Q8 is further connected to ground through a capacitor C44. The emitters of transistors Q8 and Q11 are connected to a node 182, which in turn is connected to a cathode of a Zener diode Z1. Node 182 is also connected to the cathode of Schottky diode D18 and to a node 184 through a capacitor C46. Node 184 is further connected to the anode of Zener diode Z1 and to each of resistors R96 and R58. Resistor R58 is in turn connected to a gate of a high-power n-channel field effect transistor Q6, which, like transistor Q5, includes a diode between its source and drain. The source of transistor Q6 is connected to node 180 while the drain of transistor Q6 is connected to node 170.

The cathodes of a parallel Schottky diode pair D21a and D21b are connected to node 170, while the anodes of diode pair D21a and D21b are connected to node 180. Node 180 is further connected to the main ground point of the converter unit through a fuse 202.

The RUN node 174 is connected to a gate of an n-channel field effect transistor Q2 in 12V DC voltage supply circuit 128. The source of transistor Q2 is connected to ground and the drain of transistor Q2 is connected to one end of a resistor R98. The other end of the resistor R98 is connected to a node 184, which is also connected to an anode of a Zener diode Z3. A resistor R60 and a parallel capacitor C74 connect node 184 to a node 186. Node 184 is further connected to a gate of a p-channel field effect transistor Q4, the source of which is connected to node 186 and the drain of which is connected to a node 188. The cathode of Zener diode Z3 is connected to node 186, as is the cathode of a diode D24. The anode of diode D24 is connected to a VIN power supply terminal derived from line 106.

The node 188 is connected to ground through a capacitor C48 and to an input terminal of a 12 volt voltage regulator integrated circuit U18. The output terminal of circuit U18 (node 133) furnishes 12 volts DC to other components of the circuit as noted, such as pin 20 of PWM modulator circuit U3. A resistor R62 connects the 12 volt DC output node 133 to an adjustment node 194, which in turn is connected to an output voltage adjustment terminal of the regulator U18. The adjustment node 194 is connected by a resistor R64 to ground. Node 133 is connected by capacitors C50 and C52 to ground.

Regulator U18, transistors Q2 and Q4 and associated circuit elements form a 12V DC power supply to the other circuit components which may be shut down when the tool is not demanding any power. If the RUN signal as transmitted from the microcontroller (described below) is high, transistor Q2 will be turned on, sinking current from node 184 through resistor R16 to ground. This reduces the voltage on the gate of transistor Q4, turning its source-drain current path on and connecting the VIN power supply from the regulator input node 188. Connecting power to node 188 in turn supplies 12V DC regulated power at node 133. When node 174 is low, transistor Q2 will not be conductive and the voltage at node 184 will be high. This shuts off input power to the regulator chip U18 and therefore cuts off 12V DC power at node 133. This power source will therefore be cut off from the IC U3 and the collector of transistor Q8, obviating power consumption by these circuit elements while in an idle state.

The inductor L1 is connected between the node 170 and a node 196; node 196 is in turn connected to pin 12 of PWM modulator U3 as one of two lines in the current sense communications path 136. Each of three relatively low-resistance resistors R66, R53 and R102 is connected between the node 196 and a second current sense node 140, which is connected to a positive tool voltage output port VOUT. The voltage on second current sense node 140 is supplied to pin 11 of controller U3; from this voltage drop and the parallel combination of resistances R53, R66 and R102, the controller U3 can deduce the amount of current going through positive output node 140 and regulate the duty cycle accordingly. This voltage drop is also supplied to the microcontroller U2, as will be described below.

A bank of large capacitors (C24, C25, C26 and C70) connects node 140 to node 180. Node 140 is also connected to a bridge node 200 via a resistor R68. A resistor R70 connects node 200 to negative power supply node 180. Node 200, from which is derived a voltage sense line, is connected to pin 9 of the PWM controller circuit U3.

Nodes 200 and 180 are connected by external connector elements (described below) to respective terminals of an output voltage selector R72 located in the adapter unit 52. The predetermined value of the resistor R72 will change according to the desired input voltage of the hand tool. In a preferred embodiment, resistor R72 will be selected according to the following table:

TABLE I

Voltage Selector Resistor (R72) Values

| Tool Label | Actual Voltage | R72 Value (Ω) |
| --- | --- | --- |
| 24.0 | 27.7 V | 1.21 K |
| 18.0 | 20.5 V | 1.87 K |
| 14.4 | 16.4 V | 2.67 K |
| 12.0 | 13.8 V | 3.74 K |
| 9.6 | 11.0 V | 6.49 K |
| 7.2 | 8.2 V | 24.3 K |

Figure 7A:
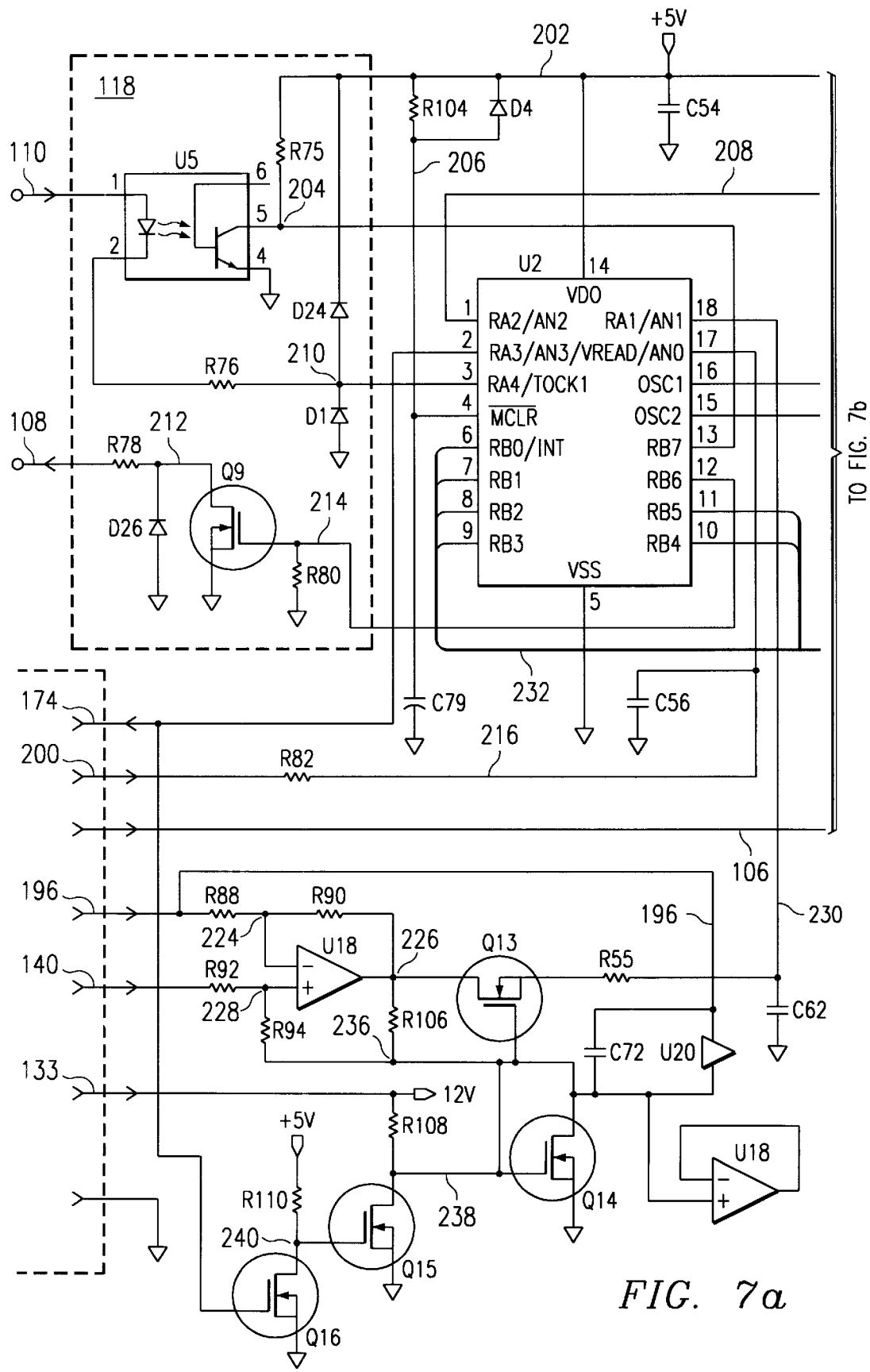
FIG. 7 is a detailed electrical schematic diagram of microcontroller, display, temperature sensor and power shutdown circuits used in a preferred embodiment of the invention.
Figure 7B:
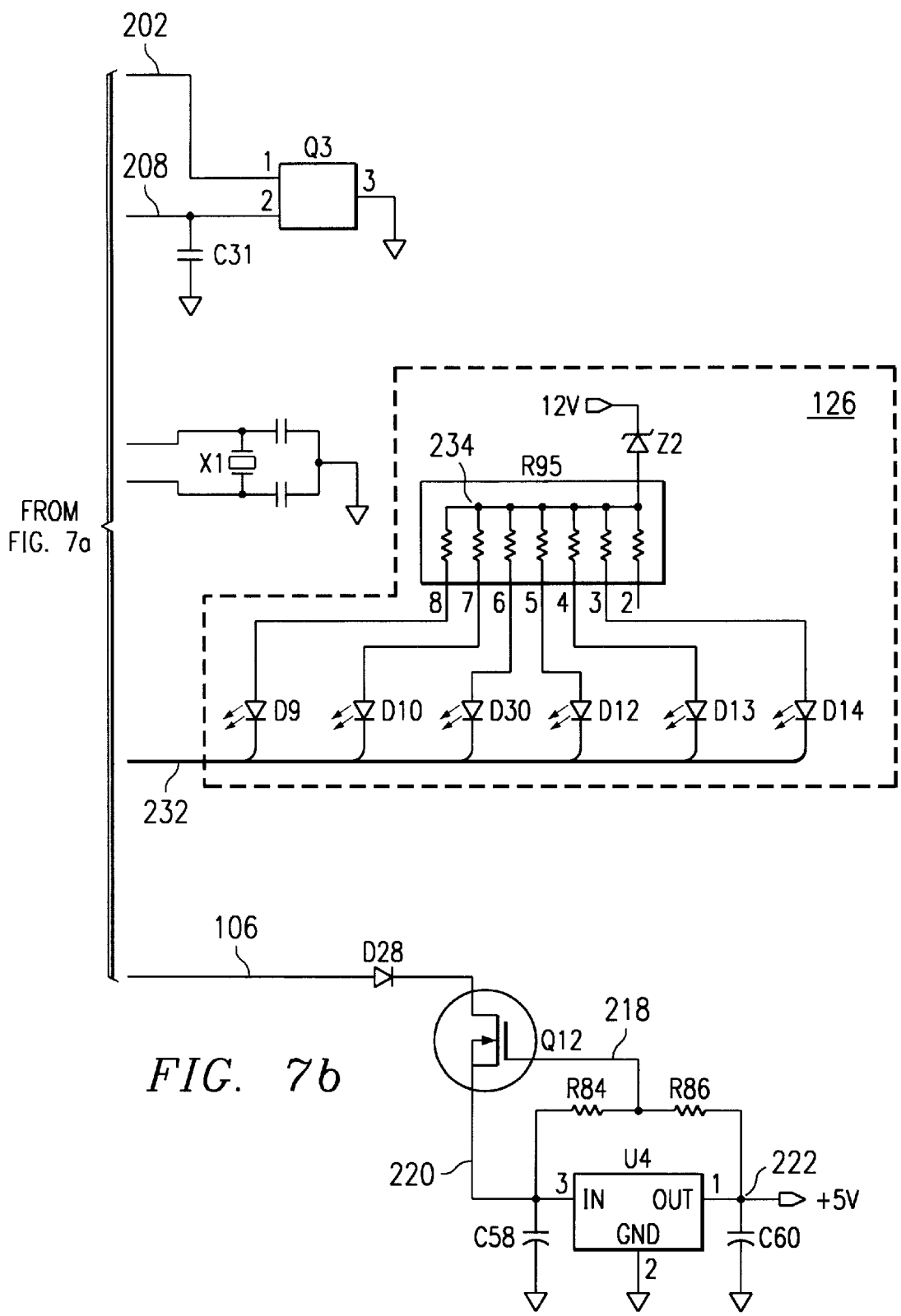

Referring next to FIG. 7, control circuitry and certain other circuitry of the invention are shown in detail. The battery temperature thermistor wire 110 is connected to a first terminal of an optical isolator unit U5. A second terminal of isolator U5 is connected via a resistor R76 to a node 210. A third, output terminal of the isolator is connected to a node 204, while a fourth terminal of the isolator is connected to ground. A resistor R75 connects node 204 to a node 202, which is in turn connected to a five volt DC power supply for the board on which the circuitry illustrated in FIG. 7 is implemented. This power supply is connected to pin 14 of a microcontroller U2, which in the illustrated embodiment is a PIC16C711-D4/P made by Microchip Corporation and which includes an analog/digital converter (not shown). Node 202 is further connected to ground via a capacitor C54, to a terminal of a temperature sense transistor Q3, to one end of a resistor R104, and to a cathode of a diode D4. The optical isolator output node 204 is connected to a pin 13 of the microcontroller U2. The node 210 is connected to a cathode of a diode D1, the anode of which is connected to ground, and to an anode of a diode D24. Node 210 is finally connected to a pin 3 of the microcontroller U2.

A node 206 is connected to the anode of diode D4 and to node 202 through resistor R104. Node 206 is connected to ground through a capacitor C70 and is connected to pin 4 of the microcontroller U2.

A temperature sense output node 208 is connected to a second terminal of the temperature sensor Q3. A capacitor C31 is connected between node 208 and ground. Node 208 is connected to a pin 1 of the microcontroller U2. A third terminal of the temperature sensor Q3 is connected to ground.

The data out communications line 108 is connected to a node 212 by a resistor R78. The node 212 is connected to a drain of an n-channel field effect transistor Q9 and to a cathode of a diode D26, the anode of which is connected to ground. A source of transistor Q9 is connected to ground, while a gate of transistor Q9 is connected to a node 214. A resistor R80 connects node 214 to ground. Node 214 is connected to pin 12 of microcontroller U2.

The RUN line 174 is connected directly to pin 2 of microcontroller U2. A resistor R82 connects startup voltage sense line 200 to a node 216. A capacitor C56 connects node 216 to ground. Node 216 is connected to pin 17 of the microcontroller U2.

A VIN power supply line 106, at a voltage which can range from 20 to 50 volts and which is connected to battery pack 44, is connected to an anode of a diode D28, the cathode of which is connected to a drain of an n-channel field effect transistor Q12. A gate of transistor Q12 is connected to a node 218. A resistor R84 connects node 218 to a node 220, which in turn is connected to a source of the transistor Q12 and to an input of a voltage regulator integrated circuit U4. A capacitor C58 is connected between node 220 and ground.

A resistor R86 connects node 218 to a node 222, which is connected to the output of the 5V DC voltage regulator U4, and which therefore supplies 5V DC output power to those circuits illustrated in FIG. 7 which need it, and particularly to the VDD of microcontroller U2. A capacitor C60 connects node 222 to ground.

The positive current sense line 196 is connected by a resistor R88 to a node 224, which in turn is connected to a negative input terminal of a comparator U18. An output terminal of the comparator U18 is connected to a node 226, which is connected by a resistor R90 to node 224. The "negative" current sense line 140 is connected through a resistor R92 to a node 228, which in turn is connected to a positive input terminal of the comparator U18. The node 228 is further connected through a resistor R94 to a node 236. Node 236 is connected to comparator output node 226 by a resistor R106, and further to a drain of an n-channel field effect transistor Q14.

The 12V DC power supply node 133 is connected by a resistor R108 to a node 238, which is in turn connected to a drain of a transistor Q15, a gate of transistor Q14 and the gate of the transistor Q13. A capacitor C72 is connected between node 236 and positive current sense node 196, as is a comparator IC U20. A resistor R55 connects a source of the transistor Q13 to an ISIG node 230, which in turn is connected to a current sense pin 18 of the microcontroller U2. A capacitor C62 is connected between ISIG line or node 230 and ground.

The RUN node 174 is connected to a gate of a n-channel field effect transistor Q16. The drain of transistor Q16 is connected to a node 240, while a source thereof is connected to ground. Node 240 is connected to a 5 volt DC power supply through a resistor R110 and to the gate of transistor Q15.

A frequency source, such as a ceramic resonator X1, is connected between oscillator pins 15 and 16 of the microcontroller U2. A third terminal of resonator X1 is connected to ground. A six-conductor LED control bus 232 connects pins 6–11 of the microcontroller U2 to the cathodes of light-emitting diodes D9, D10, D30, D12, D13 and D14, respectively, the anodes of which are connected through separate resistors in a resistor block R95 to a node 234. Node 234 is connected to an anode of a Zener diode Z2, the cathode of which is connected to the 12V DC power supply 128 (FIG. 6).

The following tables set forth representative values for the resistors (Table II) and the capacitors (Table III) described and illustrated in FIGS. 5a, 5b, 6 and 7.

TABLE II

Resistor Values (ohms)

| R1 | 806 K | R29 | 1 K | R64 | 4.32 K |
|----|-------|-----|-----|-----|--------|
| R2 | 806 K | R30 | 1 K | R66 | 0.005 |
| R3 | 806 K | R31 | 10 K | R68 | 20 K |
| R4 | 806 K | R32 | 10 K | R70 | 4.22 K |
| R5 | 806 K | R33 | 10 K | R72 | Variable - See Table 1 |
| R6 | 806 K | R34 | 10 K | R74 | 1.30 K |
| R7 | 280 K | R35 | 10 K | R75 | 10 K |
| R8 | 280 K | R36 | 10 K | R76 | 100 |
| R9 | 280 K | R37 | 470 | R78 | 220 |
| R10 | 280 K | R38 | 10 K | R80 | 10 K |
| R11 | 280 K | R39 | 20 | R82 | 10 K |
| R12 | 280 K | R40 | 100 K | R84 | 39 K |
| R13 | 2 M | R41 | 0.010 | R86 | 39 K |
| R14 | 2 M | R42 | 180 | R88 | 10.0 K |
| R15 | 2 M | R43 | 470 | R90 | 499 K |
| R16 | 2 M | R44 | 470 | R92 | 499 K |
| R17 | 2 M | R45 | 0.010 | R94 | 499 K |
| R18 | 2M | R46 | 20 K | R95 | 150Ω ea. |
| R19 | 47 K | R47 | 498 K | R96 | 10 K |
| R20 | 47 K | R51 | 180 | R98 | 47 K |
| R21 | 47 K | R52 | 9.09 K | R100 | 39 K |
| R22 | 47 K | R53 | 0.005 | R102 | 0.010 |
| R23 | 47 K | R54 | 4.7 K | R104 | 20 K |
| R24 | 47 K | R55 | 100 K | R106 | 270 |
| R25 | 1 K | R56 | 16.9 K | R108 | 1 M |
| R26 | 1 K | R58 | 10 | R110 | 330 K |
| R27 | 1 K | R60 | 4.3 M | | |
| R28 | 1 K | R62 | 475 | | |

TABLE III

Capacitor Values

| C1 | 0.1 µF | C20 | 68 µF | C42 | 1000 pF |
|----|--------|-----|-------|-----|---------|
| C2 | 0.1 µF | C21 | 2.2 µF | C44 | 1 µF |
| C3 | 0.1 µF | C22 | 2.2 µF | C46 | 1 µF |
| C4 | 47 µF | C23 | 68 µF | C48 | 10 µF |
| C5 | 47 µF | C24 | 1000 µF | C50 | 1.0 µF |
| C6 | 47 µF | C25 | 1000 µF | C52 | 0.1 µF |
| C7 | 2.2 µF | C26 | 1000 µF | C54 | 0.1 µF |
| C8 | 0.1 µF | C27 | 1 µF | C56 | 1000 pF |
| C9 | 0.1 µF | C28 | 1 µF | C58 | 1.0 µF |
| C10 | 0.1 µF | C29 | 470 µF | C60 | 1.0 µF |
| C11 | 0.1 µF | C30 | 470 µF | C62 | 0.1 µF |
| C12 | 1.0 µF | C31 | 0.1 µF | C64 | 0.1 µF |
| C13 | 0.1 µF | C32 | 1000 pF | C66 | 2200 pF |
| C14 | 0.1 µF | C35 | 470 µF | C68 | 0.1 µF |
| C15 | 0.1 µF | C36 | 470 µF | C70 | 1.0 µF |
| C16 | 0.1 µF | C37 | 470 µF | C72 | 0.1 µF |
| C17 | 0.1 µF | C38 | 0.1 µF | C74 | 0.1 µF |
| C18 | 0.1 µF | C39 | 1 µF | | |
| C19 | 0.1 µF | C40 | 1000 pF | | |

With particular reference to FIGS. 6 and 7, the basic operation of the DC to DC converter is as follows. In FIG. 6, transistor Q5 acts like a switch and is ultimately controlled by the state of pin 19 of control chip U3. Preferably, the FET Q5 is opened and closed at a frequency of 100 KHz. The on and off time, or duty cycle, is controlled by a circuit in unit U3 designed to hold the voltage at node 140 relatively constant. When the load lowers the voltage at node 140, the duty cycle or ON time will be increased, pumping more charge into the node 170.

When transistor Q5 is closed, current flows into inductor L1 to charge the capacitors C24, C25 and C26. When transistor Q5 is opened, inductor L1 tries to maintain current flow, drawing current from diodes 21a and 21b and transistor Q6. The voltage across inductor L1 appears to reverse, such that node 170 is negative by an amount sufficient to permit diodes 21a and 21b to conduct. The combined capacitance values and, more importantly, the equivalent series resistance (ESR) of C24, C25 and C26 are selected such that the voltage waveform at output node 200 stays relatively constant.

The second switching FET Q6, put in parallel with the diodes D21a and D21b, is turned on by a control circuit consisting of bipolar transistors Q8 and Q11 and the resistors and capacitors associated with these transistors. Pin 16 of PWM controller U3 controls the transistors Q5 and Q6 such that they are never on at the same time. The ON resistance of the FET Q6 offers less loss than the forward voltage drop of the diodes D21a and D21b. This enhancement is called synchronous rectification.

The circuitry disclosed in FIGS. 6 and 7 permit a DC to DC converter to be used in a hand tool with acceptable power delivery. If a circuit of this type were provided to supply 50 amperes continuously, its size, weight and cost would be impractical for a hand-held hand tool application. The power required by such a hand-held tool, such as a saw or a drill, can be extremely high for a short period of time. For example, a "12 volt" drill really runs at 13.8 volts and can draw 50 amps, resulting in a power requirement of 690 watts. At an average efficiency of 93%, the converter would give off 48 watts of heat. A practical housing of the converter unit at the tool handle would be about three inches by four inches by 2.5 inches, or about 30 cubic inches. Forty-eight watts would raise the temperature in this volume to over 70 degrees C. in 10 to 20 seconds. This is a temperature too hot to touch; further, many of the commercial grade electronic parts, preferred for their cost, are not specified to operate above this temperature.

One way to circumvent this problem is to take advantage of the limited time that the average power tool is required to put out full power. The present invention uses a microprocessor (U2) with an internal analog to digital converter with current sense resistors which measures the current required by the load and the time during which it is required. The microprocessor then turns off the converter using a shutoff circuit according to a predetermined, stored algorithm before heat can damage any of the components.

Figure 18:
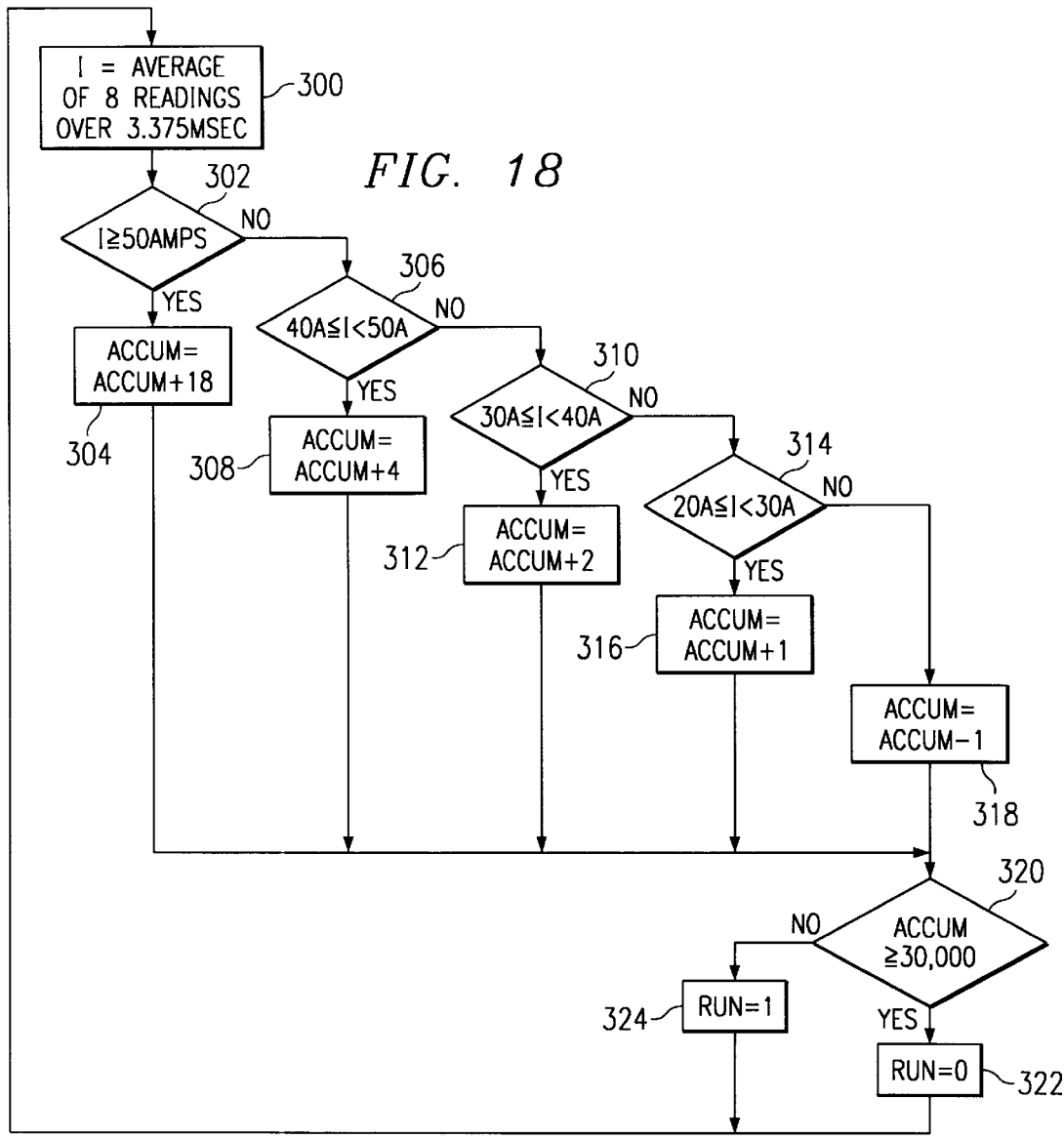
FIG. 18 is a flowchart showing one possible overheating protection shutdown algorithm for use with the invention.

One representative algorithm to do this is executed in the preferred embodiment by the microcontroller U2 and is illustrated in FIG. 18. At step 300, the microcontroller U2 inspects the ISIG voltage at node 230. The voltage at node 230 is derived from the current sense lines 140 and 198, which in turn measure the voltage drop across shunt resistors R53, R66 and R102 (FIG. 6). Fifty amperes of current flowing through these resistors yields 5.0 volts at node 230 (FIG. 7). The A/D converter incorporated into the microcontroller U2 takes an average of eight readings over approximately 3.375 milliseconds to minimize the effect of noise and other anomalies.

At decision step 302, the algorithm tests whether or not the sensed current is greater than or equal to 50 amperes. If so, eighteen counts are added to an accumulator (not shown) incorporated into microcontroller U2 at step 304. If not, at step 306, the algorithm decides whether or not the sensed and averaged current is greater than or equal to 40 amperes, but less than 50 amperes. If this condition is true, at step 308 four counts are added to the accumulator. If the current is less than 40 amperes but greater than or equal to 30 amperes, as tested at step 310, at step 312 two counts are added to the accumulator. Finally, at step 314 the algorithm decides whether the current is greater than or equal to 20 amperes but less than 30 amperes, or in the alternative is less than 20 amperes. If the current is greater than or equal to 20 amperes but less than 30 amperes, at step 316 the algorithm will add one count to the accumulator. Otherwise, at step 318 the algorithm will deduct one count from the accumulator. During most iterations, the tool will be drawing substantially less than 20 amperes, causing a subtraction operation from the accumulator sum.

Having added or subtracted counts from the accumulator at steps 304, 308, 312, 316 or 318, at step 320 the procedure tests whether or not the stored counts now exceed 30,000. If the accumulator counts now exceed this threshold, RUN is set to zero at step 322, turning off the PWM controller U3 and the 12 volt power supply 128 (FIG. 6). Otherwise, at step 324 RUN is set high. The procedure than reverts to step 300 for the next iteration. This entire algorithm takes place 296 times every second.

The weights to be added or subtracted from the accumulator based on different current values, and the constant against which the accumulator sum is tested, have been arbitrarily assigned to fit the particular design of the converter unit 50 and the intended application of it to a nominal 12 volt DC powered hand drill. The algorithm illustrated in FIG. 18 models the heat generated at different current levels for different amounts of time and models the rise or fall of temperature of the unit 50 which this would produce. Other algorithms could be used for the same purpose and can be modified for other tools and expected loading conditions.

The shutoff circuit 128 (FIG. 6) is connected to the RUN line 174, itself connected to pin 2 of microcontroller U2, the state of which turns on or off the 12V power supply circuit 128. The RUN line 174 also controls the operation of PWM controller U3.

Resistor R72, installed in the adapter 52a, provides the converter unit with a voltage sense function. A voltage will exist at node 200 which is a function of the equivalent resistance of resistors R70 and R72 in parallel. A different resistor R72 will cause the PWM modulator U3 to provide a different voltage at node 200. This voltage is read at pin 9 of the modulator U3 for the purpose of modifying the duty cycle performed by transistor Q5 (and, inversely, transistor Q6). The state of node 200 is further reflected at node 216 and pin 17 of the microcontroller U2.

The resistor R100 bypasses the switching transistor Q5 to supply a trickle of current to node 140. This sets up a voltage across resistors R68, R70 and R72 when the hand tool is not drawing power. The presence of this voltage is sensed by the microcontroller U2 through node 200 and line 216; when the voltage drops, it is an indication that the user has turned the tool on, as by actuating a trigger, and that the converter unit 50 should supply power to the tool. In response, the microcontroller U2 will cause the RUN line 174 to go high, activating the modulator U3 and switching on the 12V DC power circuit 128.

As a safety net from overheating due to high currents, the microcontroller U2 senses the temperature inside the case of converter unit 50 by the signal it receives from temperature sensor Q3 on pin 1; if the temperature exceeds 60 degrees C., the microcontroller U2 will shut the conversion circuit off.

Figure 8:
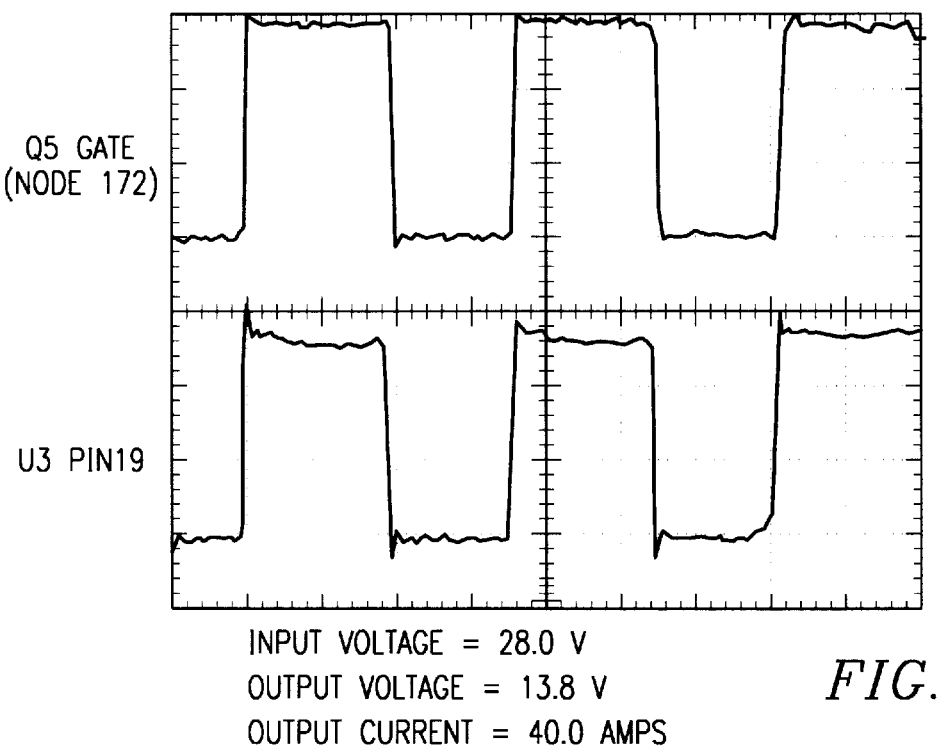
FIG. 8 is an oscilloscope trace showing behavior of the converter circuit shown in FIG. 6, showing in particular the voltage at pin 19 of PWM converter U3 and the gate of transistor Q5, showing an input voltage of 28.0 Volts and an output current of 40.0 Amps.

FIG. 8 shows a pair of oscilloscope traces illustrating the relationship of the voltage at node 172 and that at pin 19 of control chip U3. This trace was taken when the input voltage (VIN) was 28.0 volts, the output voltage at node 140 was 13.8 volts and the output current was 40.0 amps. Under these conditions, the PWM controller U3 produces a duty cycle of 54.5%. This is shown by the width of the high portions of the square wave, which tends to be slightly greater in width than the low portions. Both illustrated waves are referenced to source 170 of transistor Q5.

Figure 9:
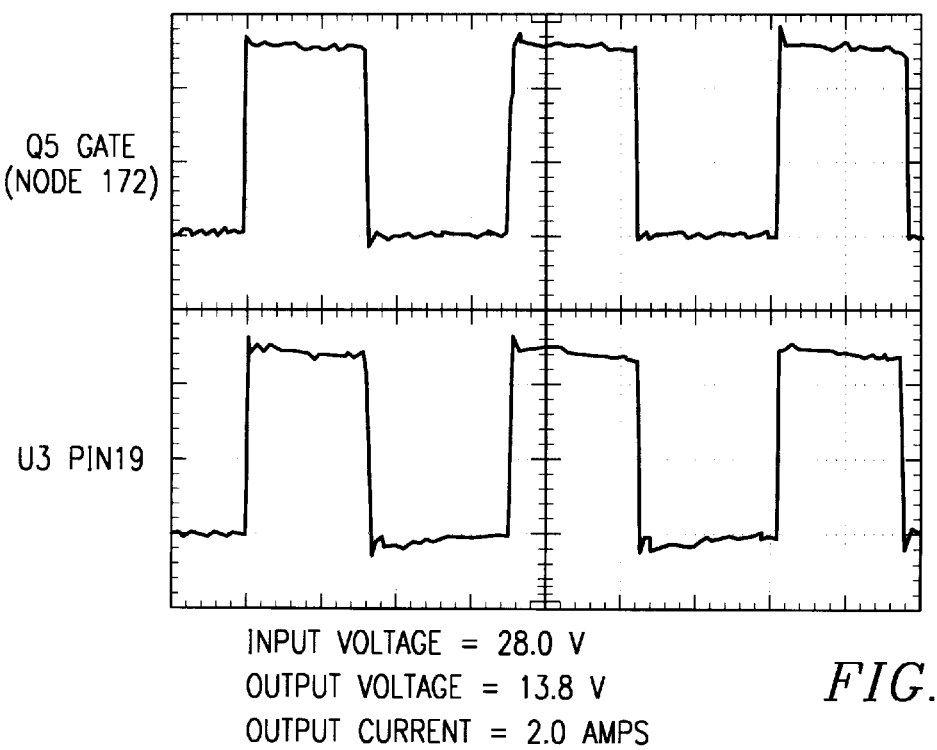
FIG. 9 is an oscilloscope trace of the nodes traced in FIG. 8, but with an input voltage of 28.0 Volts and an output current of 2.0 Amps.

FIG. 9 illustrates another oscilloscope trace at the same nodes. Once again, the input voltage at node 106 was 28.0 volts, and the output voltage at node 140 was 13.8 volts, but the output current is only 2.0 amps, a typical light duty current draw for a hand tool having its power "on", but not being highly stressed. Under these conditions, the duty cycle is 45.7% at node 172.

Figure 10:
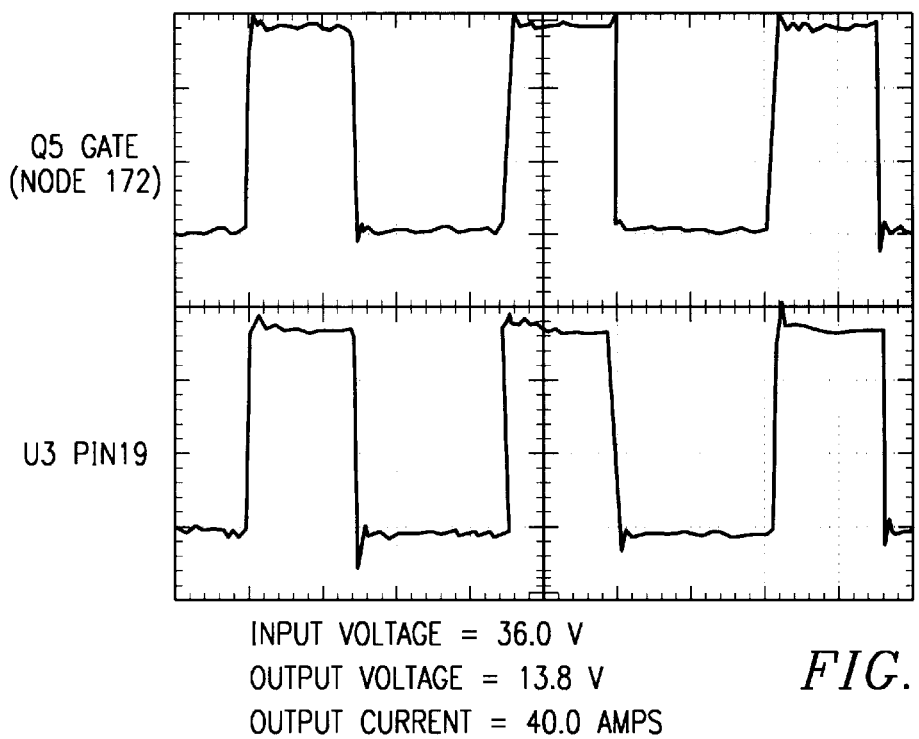
FIG. 10 is an oscilloscope trace of the nodes traced in FIG. 8, but with an input voltage of 36.0 Volts and an output current of 40.0 Amps.

FIG. 10 illustrates an oscilloscope trace for the nodes illustrated in FIGS. 8 and 9. For these traces, the input voltage at node 106 was 36.0 volts, the output voltage was 13.8 volts, and the output current was 40.0 amperes, a relatively heavy hand tool load. Under these conditions, a duty cycle of 41.8% was obtained at node 172.

Figure 11:
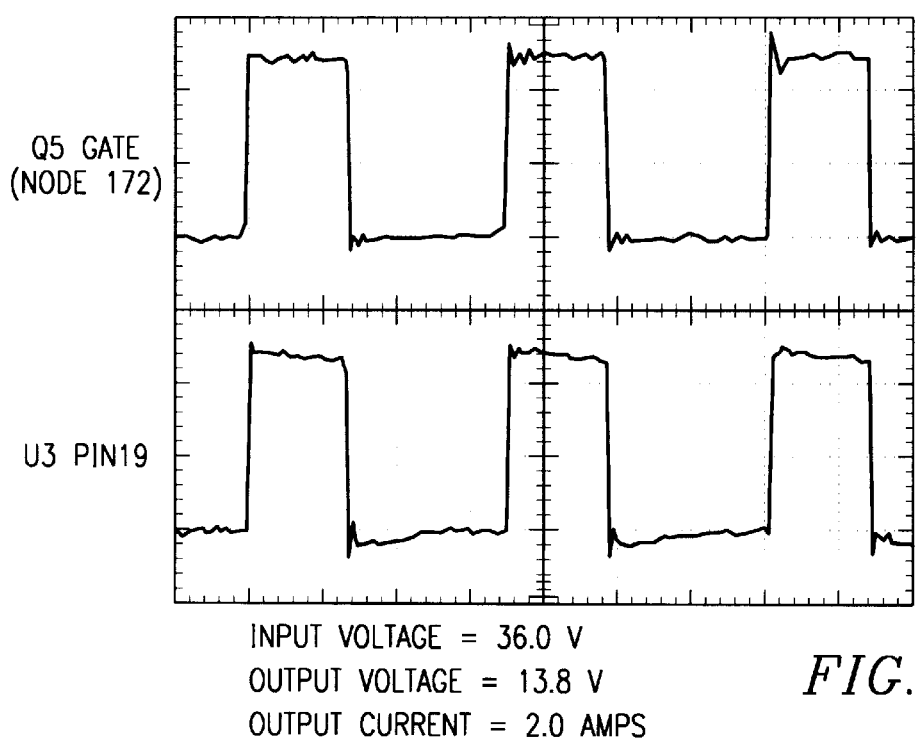
FIG. 11 is an oscilloscope trace of the nodes traced in FIG. 8, but with an input voltage of 36.0 Volts and an output current of 2.0 Amps.

FIG. 11 is yet another oscilloscope trace for these two same nodes, this time for an input voltage of 36.0 volts, an output voltage of 13.8 volts and an output current of 2.0 amps. Under these conditions, the duty cycle experienced at node 172 is considerably reduced to 37.5%. FIGS. 8–11 illustrate how the PWM controller U3 changes the duty cycle of transistor Q5 (and transistor Q6) under different power input and loading conditions.

Figure 12:
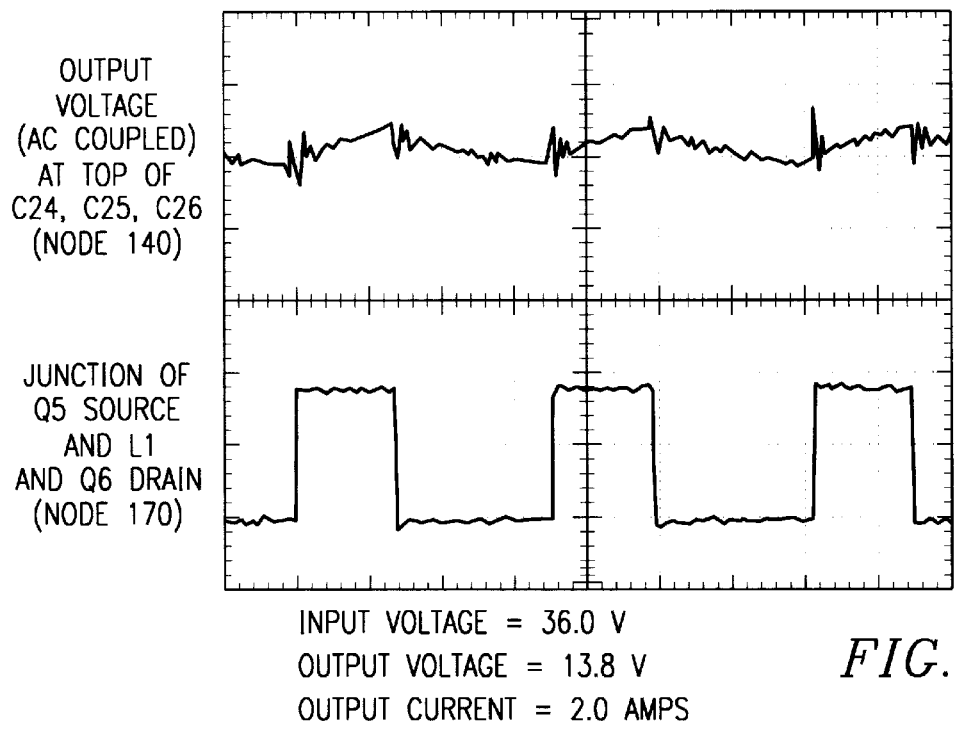
FIG. 12 is an oscilloscope trace of the voltage appearing at the source of transistor Q5 and at output node 198.

FIG. 12 is an oscilloscope trace comparing the voltage at node 170, which is at the source of the gating transistor Q5, and the output node 140. This illustrates the function of the zero crossing buck converter formed by inductor L1, gated transistor Q6, diodes D21a and D21b, and capacitors C24, C25, C26 and C70. The values of inductor L1 and the equivalent capacitance seen at node 140 are chosen to produce a substantially flat waveform at node 140 as illustrated. Node 140 rises slightly when transistor Q5 is turned on, and is drawn slightly downward when transistor Q5 is turned off.

Figure 13:
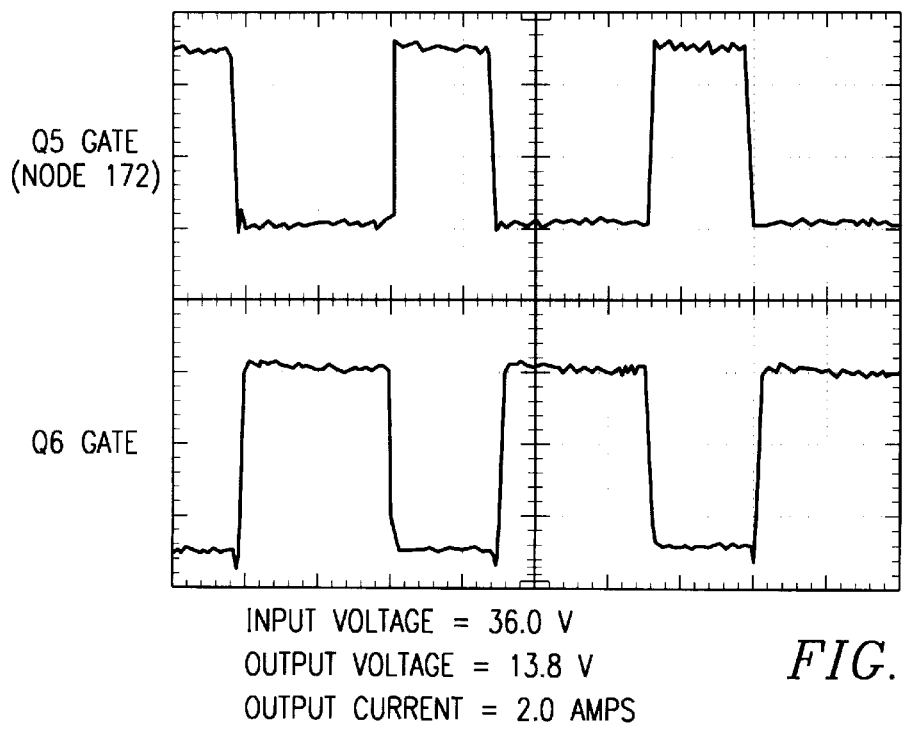
FIG. 13 is an oscilloscope trace of the voltages appearing at the gates of transistors Q5 and Q6.

The oscilloscope trace in FIG. 13 compares the voltage at node 172 (the gate of transistor Q5) to the voltage at the gate of transistor Q6. This illustrates that the transistors Q5 and Q6 are never permitted to be on at the same time, with the duty cycle of one essentially being the inverse of the other.

Figure 14:
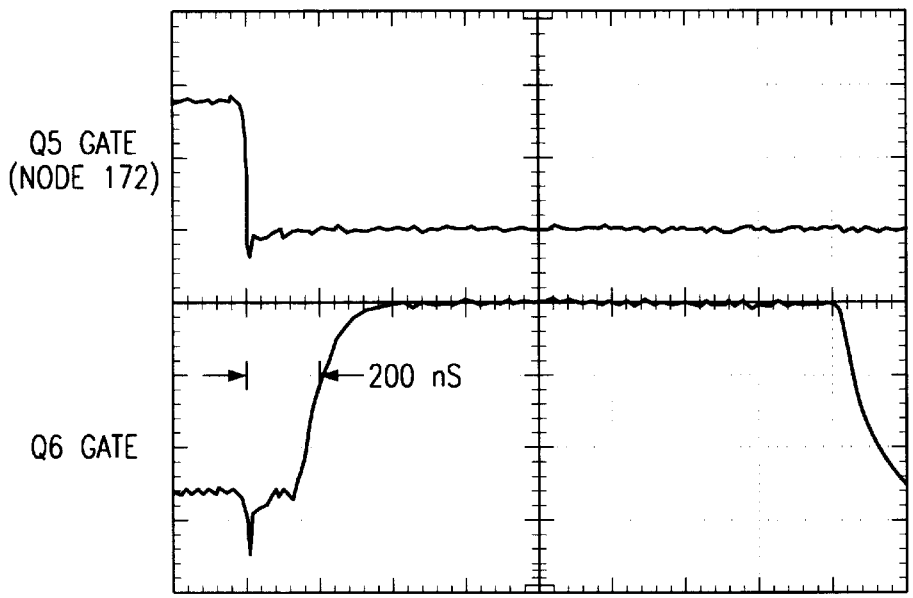
FIG. 14 is an oscilloscope trace of the same nodes illustrated in FIG. 13, but with an expanded time scale.

FIG. 14 is an oscilloscope trace under the same conditions and at the same nodes shown by FIG. 13, with the traces being expanded in time. The gate of transistor Q6 does not turn off until transistor Q5 has been off for approximately 200 nanoseconds, which prevents both of them from being on at the same time. The small and negative transition on transistor Q5 is a reflection of inductor L1 showing a negative voltage and the diodes D21a and D21b beginning to conduct before the FET Q6 is turned on.

Figure 15:
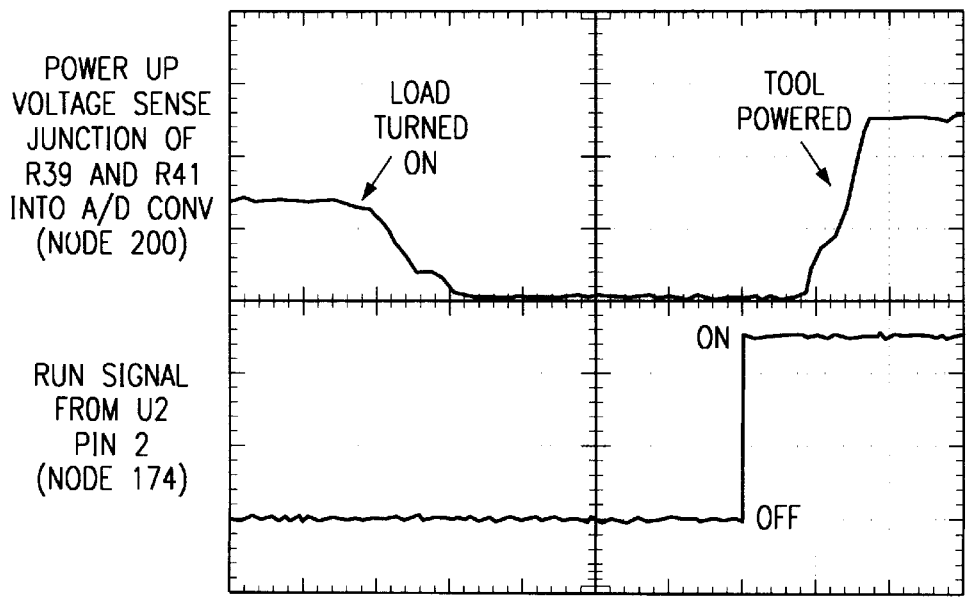
FIG. 15 is an oscilloscope trace of node 200 and at pin 2 of microcontroller U2.

FIG. 15 illustrates an oscilloscope trace of node 200 at the output of the hand tool and the state of the RUN signal on node 174. This oscilloscope trace illustrates the start up voltage sense feature of the invention. The start up voltage signal appearing at node 200 begins at about 750 millivolts when the hand tool is an "off" condition. This is the voltage provided by the trickle current passing through resistor R100. When the tool is turned on, this voltage is drained away quickly. The analog/digital converter incorporated into microcontroller U2 senses this change and commands the RUN signal on line 174 to go high, turning on the converter control chip U3 and the 12V DC power supply 128. The entire turn-on sequence takes approximately 70 milliseconds.

Figure 16:
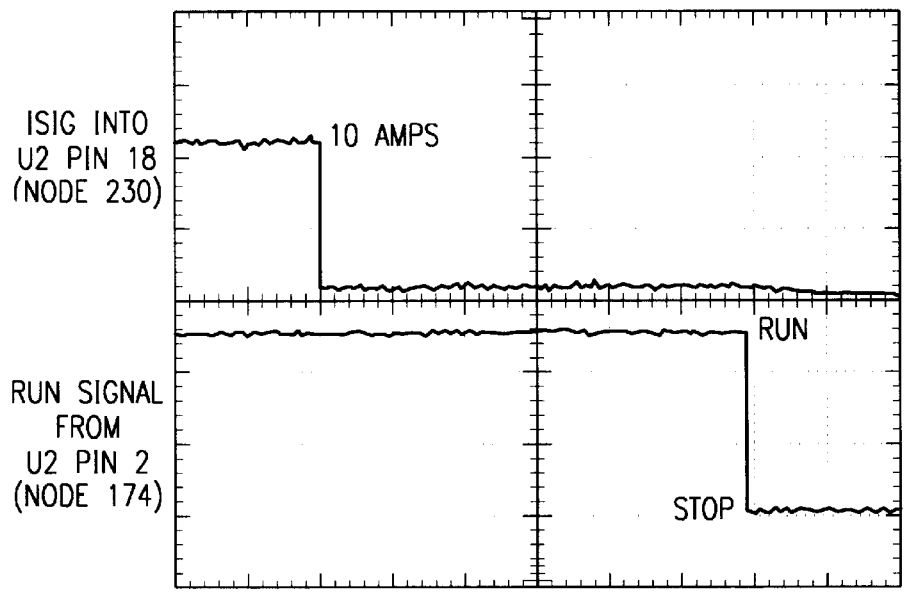
FIG. 16 is an oscilloscope trace of pin 18 of PWM converter U2 and pin 2 of PWM converter U2.

FIG. 16 illustrates a pair of node voltages over time to illustrate the shut down feature of the invention. The upper trace is ISIG taken from node 230; the lower trace is the RUN signal on node 174. The ISIG voltage on node 230, derived from the current sense on lines 196 and 140 (FIG. 6), will drop when the hand tool is no longer drawing power. When this happens, the microcontroller U2 waits for about six seconds before changing the state of the RUN signal on node 174 from a high "on" condition to a low "off" condition, shutting down the control chip U3 and the 12 volt power supply 128 through transistor Q2.

Figure 17:
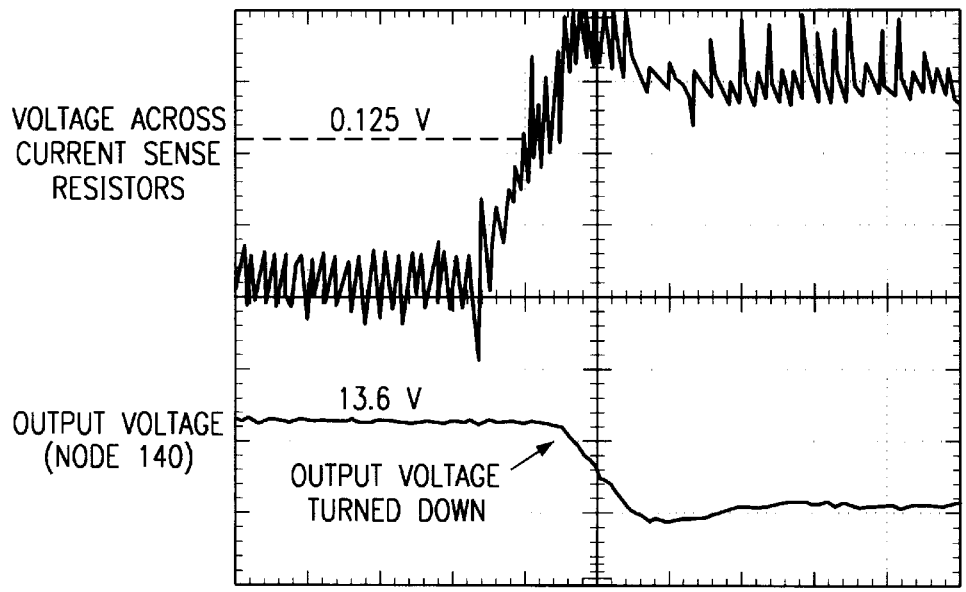
FIG. 17 is an oscilloscope trace of the voltage across the current sense resistors and at the power output.

FIG. 17 illustrates a built in current limiting feature of the invention. The upper trace illustrates the voltage across the current sense resistors, or node 196 as compared with node 140. The lower trace illustrates the output voltage at node 140. The voltage across the shunt resistors R53, R66 and R102 is relatively small and has spikes in it caused by slugs of current charging the capacitors C24, C25, C26 and C70. The control chip U3 monitors this voltage at its pins 12 and 11. If this voltage becomes as high as 0.125 volts, this would mean that approximately 62.5 amperes of output current are passing through those resistors, which have a combined resistance of 0.002 Ω in the illustrated embodiment. In this instance, the control chip U3 would set the duty cycle to close to zero so that the output voltage becomes very low. In FIG. 17, the output was shorted, causing the current to rise sharply. Within 100 microseconds, the output voltage at node 140 begins to drop.

FIG. 19 is a perspective view of second, preferred embodiment of a power supply system according to the invention. A converter unit 50 includes a display 126 on one of its sides 350. The converter unit 50 has opposed end walls 352 and 354 both adjoining the sidewall 350. A first adapter 52a is shown assembled to the converter unit 50 and has sloping sidewalls 356 which form a transition between the generally vertical sidewall members 352 and 354 and the sidewalls of an insert 64. The converter is connected by a connector cord 46 to a battery pack 44 through a connector 358. The connector 358 is attached at an upper corner of the battery pack 44 and is located close to the intersection of a top surface 360 and a sidewall 362 thereof. The converter unit 50 is designed to be used with a plurality of adapters 52, a further adapter 52b being shown for another tool.

Figure 20A:
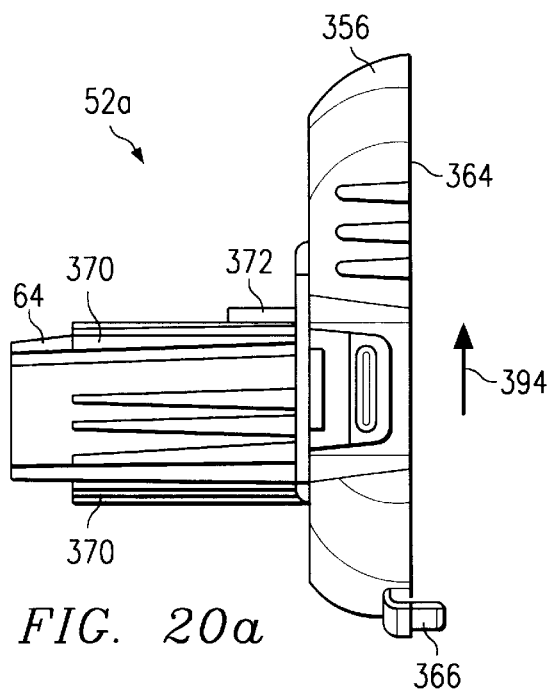
FIG. 20a is a side elevational view of an adapter according to the second embodiment of the invention.

FIGS. 20a–21b show the adapter 52a and subassemblies thereof in more detail. As best seen in FIGS. 20a, 20b and 20c, the adapter 52a has a generally flat bottom 364 except for a pair of processes, tabs or stops 366 and 368. The insert portion 64 has a plurality of ribs 370 and keying structures 372. The ribs 370 and keying structures 372 are specially provided to fit within a battery cavity (not shown) of a specific tool 40 (FIG. 1). Further, the ribs 370 are used to provide an interference fit inside of the battery chamber. Visible in FIG. 20b are a double-pronged negative contact 374, a ground contact 376 and a double-pronged positive contact 378. The contacts 374–378 protrude into a cavity 380 which extends upwardly from the generally flat bottom surface 364, which for example can be formed as by means of a cover plate.

The plate 364 has a pair of forward slots 382 and 384 having enlarged first ends and relatively constricted second ends so as to permit the insertion and locking of converter unit pins (later described). Also provided are a pair of rear slots 386 and 388. Each of the rear slots 386 and 388 has a plastic prong 390 or 392. The slots 386 and 388 are meant to receive and retain respective pins (later described) on the converter unit 50. Each prong has an enlarged free end and an attached end, and is spaced from a slot side by an amount sufficient to permit a bending displacement as a converter unit pin shaft passes by the enlarged free end.

The slots 382–388 of the adapter unit 52a is designed to have inserted into slots 382–388 respective pins of the converter unit 50 in a direction orthogonal to face 364, until a top face of the converter unit (later described) meets the bottom face 364 of the adapter. Then, the adapter unit 52a is slid in the direction indicated by character 394 (FIG. 20a) until enlarged heads of the pins (later described) are locked by the restricted slot openings. As these pins pass by the enlarged free ends of the plastic prongs 390 and 392, they will be snapped in place, militating against the inadvertent disengagement of the converter unit 50 from the adapter unit 52a. The downwardly depending stops 366 and 368 help prevent further movement in the direction indicated in 394 by abutting the converter unit sidewall 352 (FIG. 19) when the adapter 52 is correctly assembled to the converter unit 50. Further, these stops 366 and 368 give a visual indication to the user of how the adapter should be attached to the converter unit and physically prevent the user from attempting to slide the connector unit into place in the wrong direction. The stops 366 and 368 therefore aid in having the user correctly assemble the adapter to the converter unit the first time.

Figure 20B:
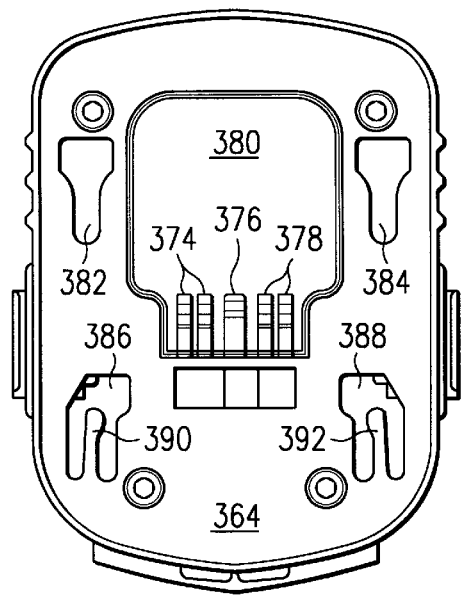
Figure 20C:
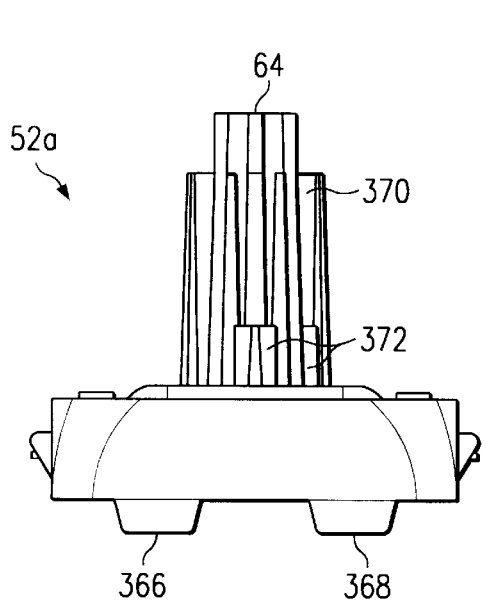
Figure 20D:
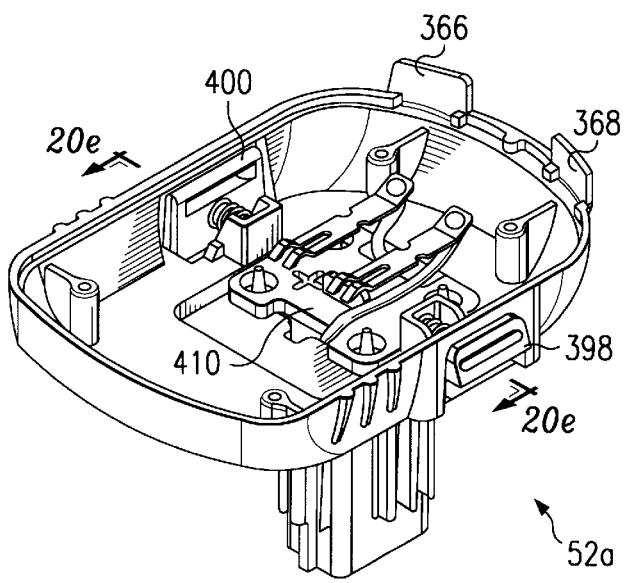
FIG. 20d is an isometric view looking toward the bottom of the adapter shown in FIG. 20a, a bottom cover having been removed.
Figure 20E:
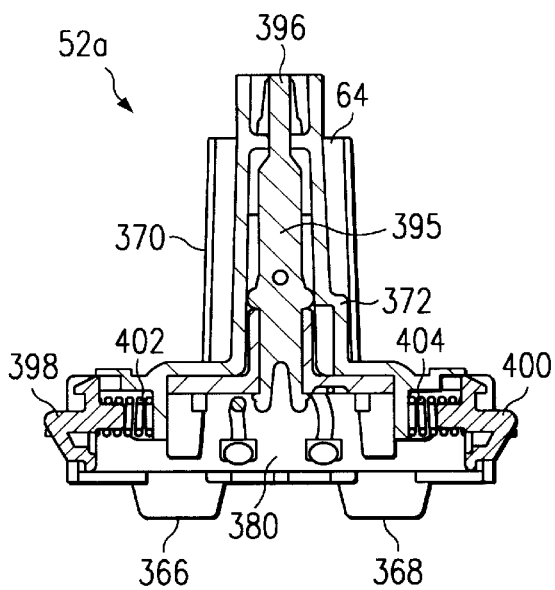
FIG. 20e is a sectional view taken substantially along line 20e–20e of FIG. 20d.

FIG. 20e is an axial section taken through the neck 64 of the adapter 52a, and taken substantially along line 20e–20e of FIG. 20d. One of the upstanding hand tool electrical contacts 395 is shown extending from a location proximate the socket-receiving cavity 380 to a top 396 of the insert 64. A pair of opposed buttons 398 and 400 are biased outward by a pair of helical springs 402 and 404 and are provided to engage a bottom lip of a drill handle. The size, shape and spacing of the buttons 398 and 400 will vary according to the hand tool for which the adapter 52a is provided.

Figure 20F:
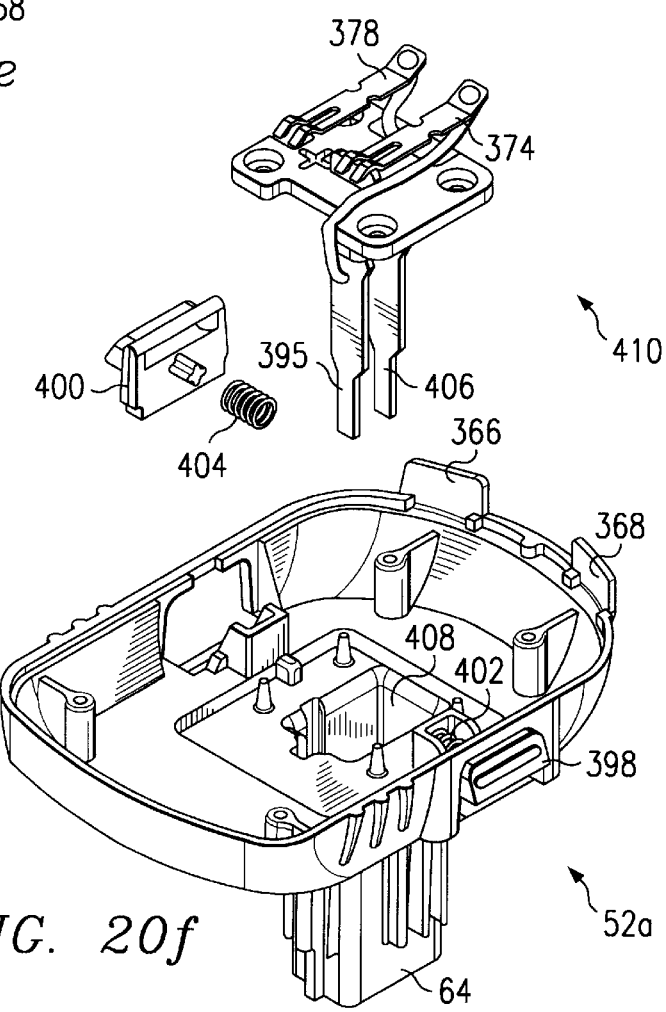
FIG. 20f is an exploded isometric view corresponding to FIG. 20d.

As illustrated in FIG. 20f, the positive and negative contacts are assembled together with negative and positive tool contacts 395 and 406 into a single contact assembly 410 prior to insertion into an interior 408 of the insert 64. FIG. 20d illustrates the contact plate subassembly 410 and the buttons 398 and 400 assembled into a single unit.

Figure 20G:
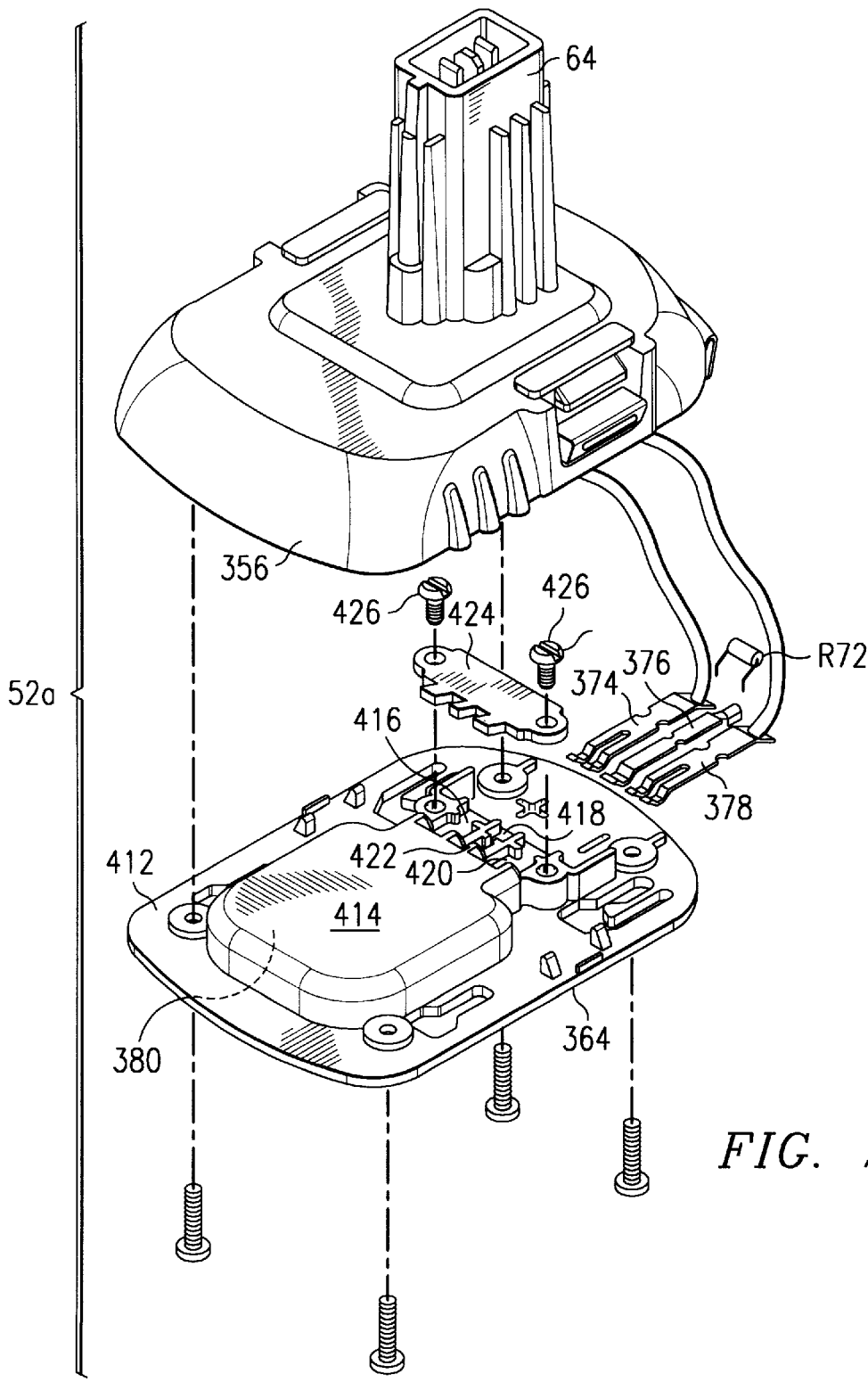
FIG. 20g is an exploded isometric view of the adapter shown in FIG. 20a, showing assembly of the adapter contacts and cover plate.

FIG. 20g shows an exploded view of the adapter 52a taken from a top direction. Here, the bottom face 364 is shown formed by a plate 412, which includes a depression which forms the recess or cavity 380. A bottom 414 of the cavity 380 is spaced upwardly from the face of plate 412. The recess 380 has three orifices 416, 418 and 420 formed into one of its sides 422. Orifices 416, 418 and 420 are sized and configured to receive contact prongs 374, 376 and 378, respectively. The adapter/converter unit contacts 374, 376 and 378 are held in place via a plate 424 and screws 426. The voltage selector resistor R72 is joined between the negative contact 374 and the ground contact 376.

Figure 21A:
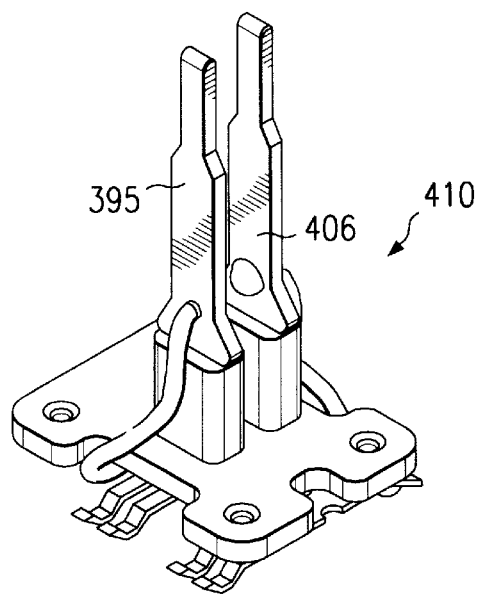
FIG. 21a is an isometric view, from an upper vantage point, of a contact plate subassembly for use in the adapter according to the second embodiment of the invention.
Figure 21B:
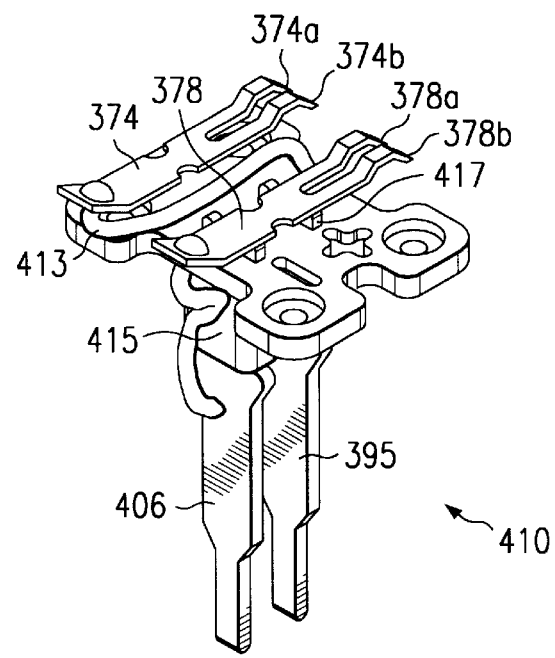

FIGS. 21a and 21b illustrate the contact plate subassembly 410 in more detail from different directions. The negative hand tool contact 395 is electrically connected to the negative adapter/converter unit contact 374 by a wire 413, as by soldering. Similarly, a wire 415 connects the positive adapter/converter unit contact 378 to the positive hand tool electrical contact 406. Each of the power contacts 374 and 378 are bifurcated into subcontacts 374a, 374b and 378a and 378b. In conventional practice, a spring metal contact such as contacts 374 and 378 have a single point of contact against the plate which they abut. The resistance of these contacts will be inversely proportional to the effective surface contact area. By bifurcating each of the power contacts into two contact prongs 374a, 374b, 378a and 378b, contact to at least two points on the opposed metal surfaces is assured. This cuts the contact resistance in half. Both of the contacts 374 and 378 are cantilevered over a bridge or support 417 so that they will exhibit appropriate springing action and will be biased against the contact plates (later described) of the converter unit 50 to which they are designed to make electrical connection.

Figure 22A:
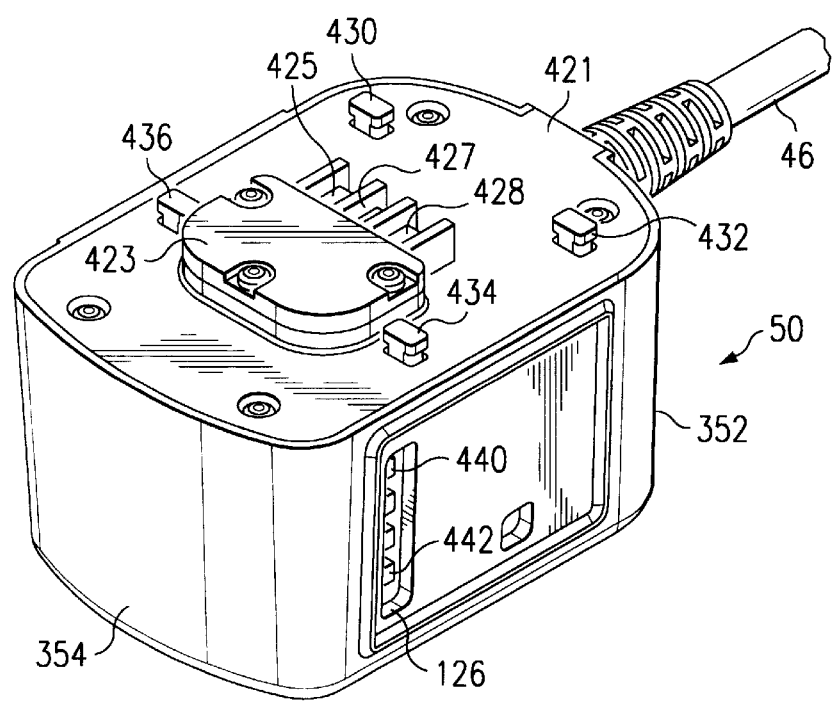
FIG. 22a is an isometric view of a converter unit according to the second embodiment of the invention.

FIG. 22a is an isometric view of an assembled converter unit 50. A generally flat top plate 421 of the converter unit 50 is designed to mate with the generally flat bottom plate 412 of the adapter 52a or 52b. An upstanding socket 423 is designed to be slid into place into the cavity 380 (FIG. 20b). Each of the contact prongs 374, 376 and 378 are designed to be received within respective socket receptacles 425, 427 and 428, which are oriented in a parallel direction toward end wall 352.

The top plate 421 includes four upstanding pins 430, 432, 434 and 436 which are provided to be received within respective slots 382, 384, 386 and 388. Each of the pins 430–436 has an enlarged head in order to be captured within a corresponding restriction of the slots 382–388.

The LED display 126 is positioned as a vertical "fuel gauge", illustrating the amount of capacity left in the battery pack to which the converter unit is attached via cord 46 from a "full" light 440 to an "empty" LED 442. The LED display 126 thus conveys the idea of a liquid vessel having a varying level of fluid in it. This pseudo liquid "level" is conveyed to the user as an amount of charge left in the battery pack before the energy therein is exhausted. This arrangement provides a quick, easily understandable visual indication of the amount of energy left in the battery pack 44.

Importantly, the floors of each of the receptacles 425, 427 and 428 are elevated above the general unit converter surface 421. This is to prevent electrical malfunction in the instance that surface 421 becomes wet, as might happen in the possibly outdoor conditions in which the converter unit 50 is designed to be used. Similarly, each of the receptacles 425, 427 and 428 is built with sidewalls separating one receptacle from the next, so as to enhance electrical insulation of one contact from the other.

Figure 22B:
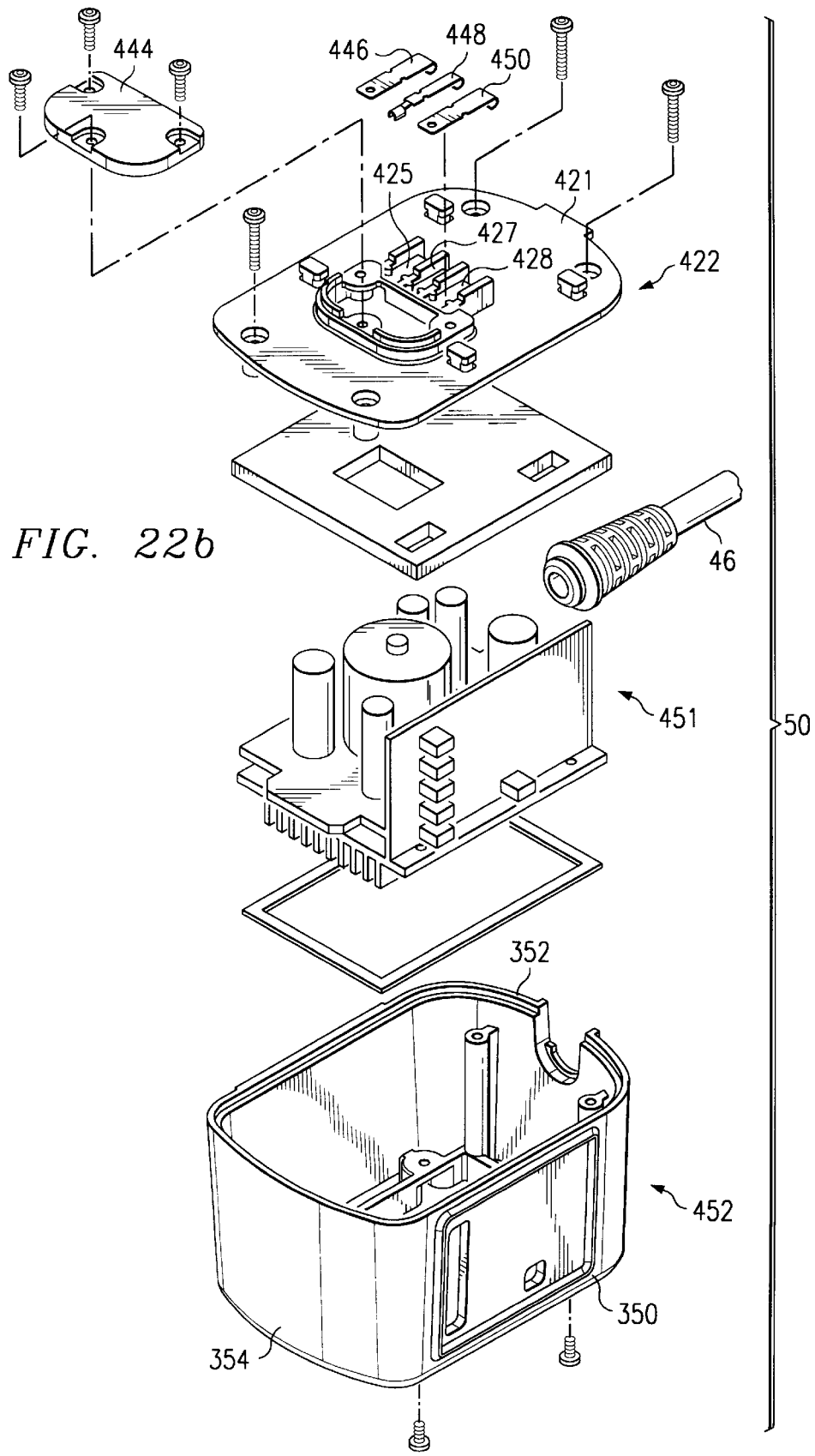

FIG. 22b shows the converter unit 50 in an exploded condition. The socket 422 includes a top plate 444 and positive, ground and negative contacts 446, 448 and 450, respectively. These metal contacts are housed on the bottoms, and form the floors of, receptacles 425, 427 and 428. Electronic components indicated generally at 451 are housed within a housing indicated generally at 452, and plates 421 and 444 are screwed into place on top of these.

Figure 23A:
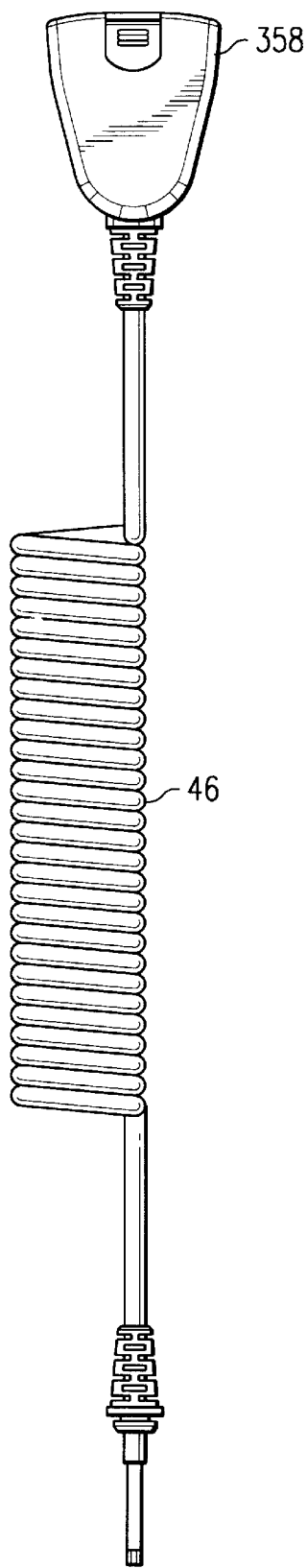
FIG. 23a is a top view of a cord and connector according to the second embodiment of the invention.
Figure 23B:
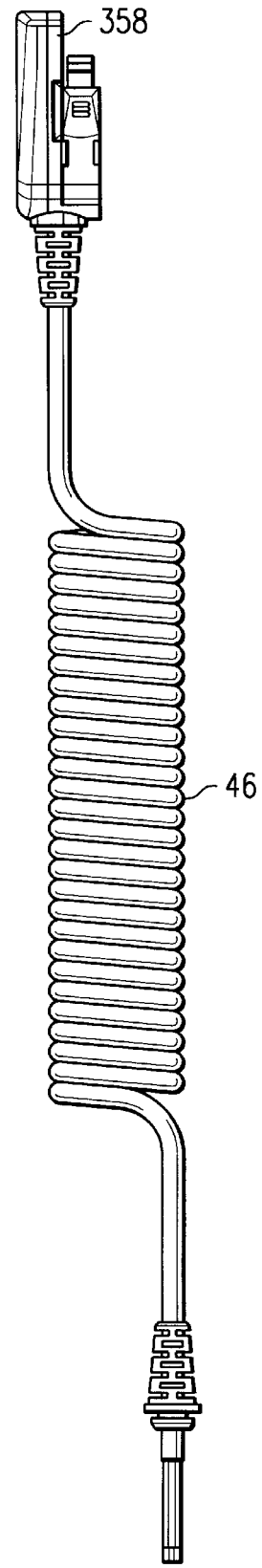
Figure 23C:
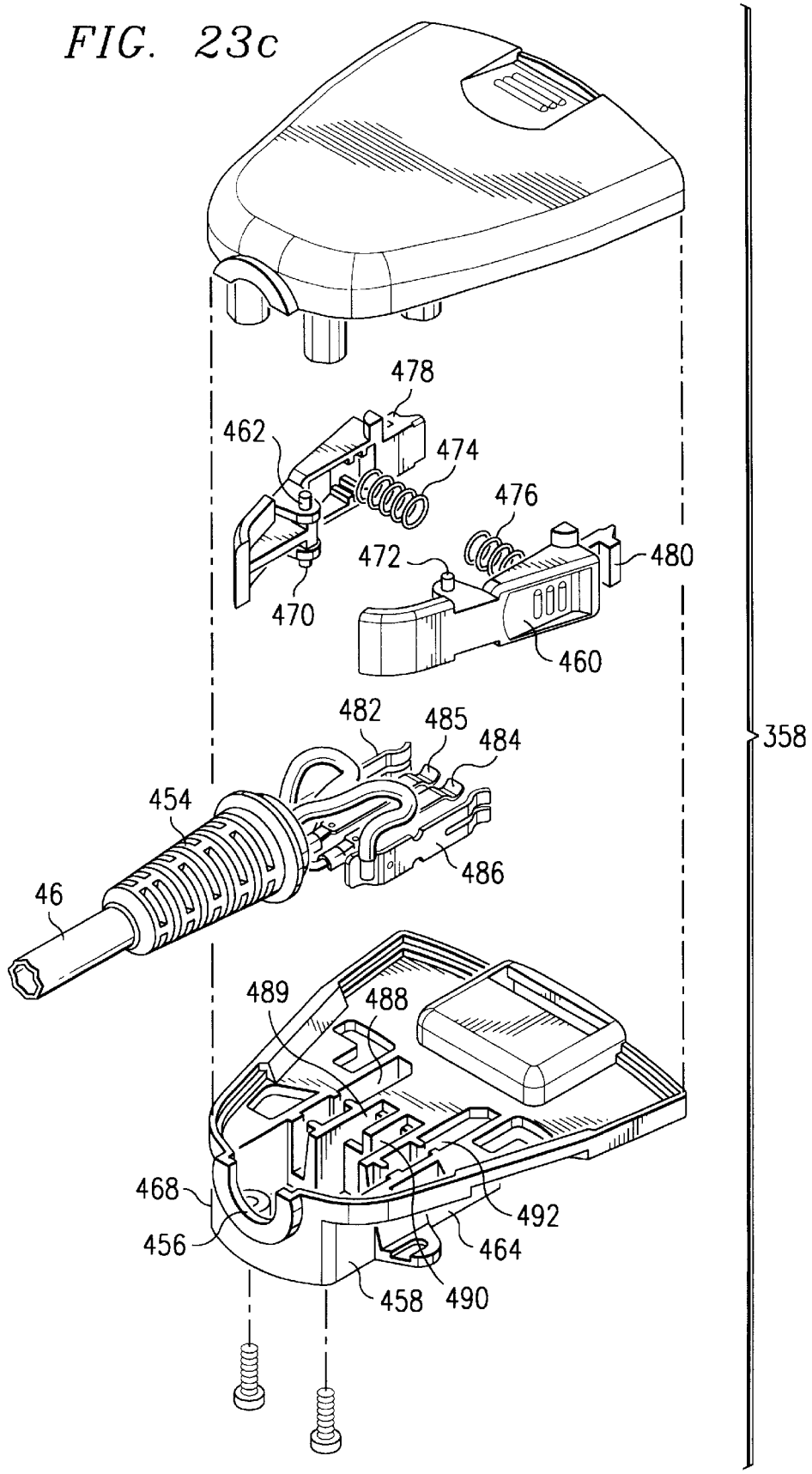
FIG. 23c is a magnified and exploded perspective view of the connector shown in FIGS. 23a and 23b.

FIGS. 23a and 23b are details of the cord 46 and the connector 358. FIG. 23c is an exploded, more magnified view of a connector 358 in particular. An end 454 of the cord 46 sits within a receptacle 456 of a connector base 458. A pair of spring loaded latches 460 and 462 sit within respective recesses 464 and 468 and rock around respective pins 470 and 472. Respective helical springs 474 and 476 spring-bias each of the latches 462 and 460 toward an outward direction. Each of the latches 462 and 460 has a respective forwardly disposed catch member 478 or 480 designed to latch with a lip of an end wall of a receptacle on the battery pack 44 (see FIG. 24). Metal contacts 482, 484, 485 and 486 are received within respective orifices 488, 489, 490 and 492 in the connector base 458. The contacts 482, 484m, 485 and 486 and 486 are so designed so that they will not be inadvertently touched by the operator when the connector 358 is attached to the battery pack 44.

FIG. 24 is an exploded isometric view of a battery pack 44 according to a preferred embodiment of the invention. The battery pack 44 includes a housing 494 conveniently formed of two sidewalls 496 and 498. Each of the sidewalls is outwardly convex in order to fit the small of a user's back. A connector recess 500 for the connector 358 (see FIG. 23c) is formed at a junction or corner of a top surface 360 and one of the end walls 362. The illustrated battery pack 44 contains ten sub "C" cells 502, although this number could be made to be more or less according to the particular application. The electronics illustrated in FIG. 5a or alternatively in FIG. 5b are placed within a housing 504. A connector socket 506 is assembled to reside within a recess 508; the recess 508 includes outward processes or lips 510 designed to catch with latch members 478 and 480 of the latches 462 and 460 of the connector 358 (FIG. 23c). Positive, negative and two communication conductors (not shown) are provided within the socket assembly 506.

The connector recess 500 is positioned on a corner of the battery pack so that the battery pack can be switched in position. In the orientation shown, assuming the back of the user is in a direction indicated by the arrow 512, a connector would be in a position to be connected to a tool being used by the right hand of the user, with the cord 46 coming off of the right shoulder of the user. This provides optimum cord length for a right-handed user in this position. Because both of the housing halves 496 and 498 are convex, and because the connector is located on a corner of the battery pack 44, the battery pack can be reversed such that the connector recess 500 is disposed at the left shoulder of the user. In this position, the cord 46 comes off the user's left shoulder and may proceed directly to a hand tool held in the left hand of the user. Thus, the combination of the convex sides of the battery pack and the corner location of the connector permits the power system of the invention to be conveniently used by either a right-handed or a left-handed person without loss of length of the power cord 46 or without experiencing further voltage drop loss because of a cord length that is more than would otherwise be required.

Figure 25A:
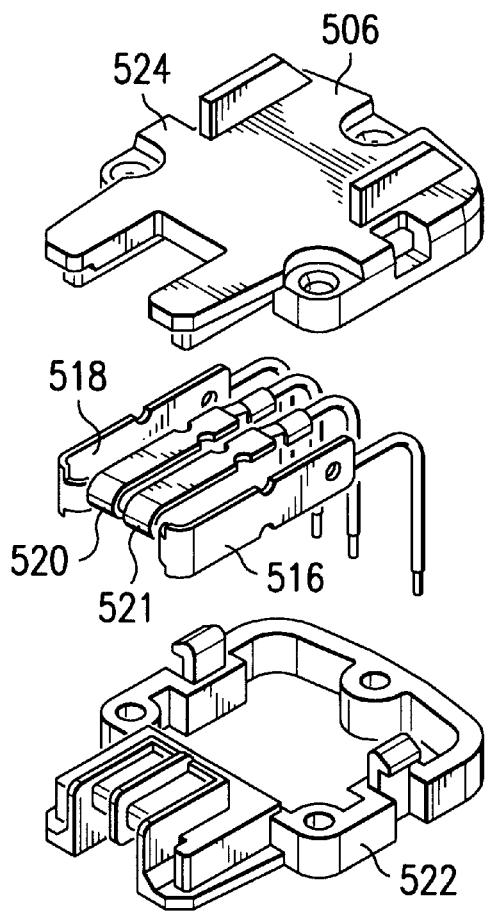
FIG. 25a is an exploded isometric view of a connector socket for use with the battery pack and the connector illustrated in FIGS. 24 and 23c, respectively.
Figure 25B:
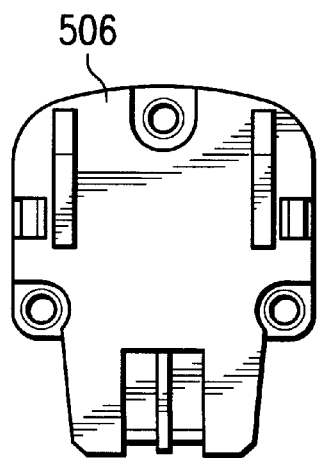
FIG. 25b is a plan view of the connector socket of FIG. 25a, shown in assembled condition.
Figure 26:
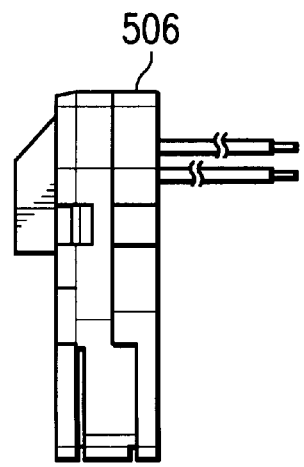
FIG. 26 is an elevational view of the connector socket shown in FIG. 25b.

FIGS. 25a, b and 26 are details of the battery pack socket 506. Positive, negative and communication line contacts 516, 518, 520 and 521 are provided to contact respective contacts 482, 485, 486 and 484 (FIG. 23c). The contacts 516, 518, 521 and 520 are joined to leads to the battery components and electronics, and are housed between a base 522 and a cover 524. Once again, the contacts 516, 518, 520 and 521 are elevated above the general recess 500 of the battery pack, so as to prevent shorting or other electrical problems due to damp or wet weather. Horizontally disposed contacts 520 and 521 are sensor contacts for provision of information concerning the state of the batteries 502 inside battery pack 44.

Figure 27A:
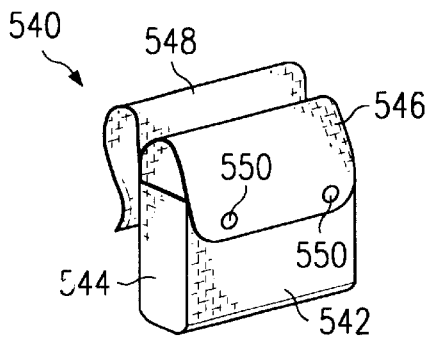
FIG. 27a is a perspective front view of a battery pouch according to the invention.
Figure 27B:
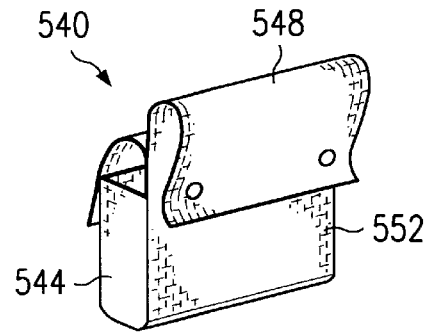

FIG. 27a–31d illustrate various reconfigurable conveying apparatus for the power system of the present invention. FIG. 27a shows a battery pouch indicated generally at 540 having a front panel 542, side panels 544 (one shown), a top flap 546, and a belt loop 548. The flap 546 is snapped over onto the panel 542 using male and female snaps 550 or the like. In FIG. 27b, a rear view of the battery pouch 540 is shown. The belt loop 548 is shown fastened as by snaps to a back panel 552.

Figure 28A:
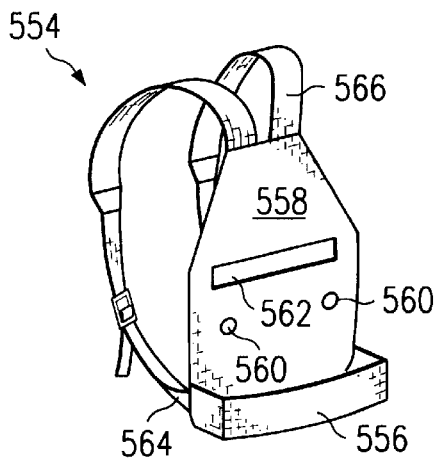
FIG. 28a is a rear perspective view of a backpack adapter for use with the battery pouch shown in FIGS. 27a–b.
Figure 28B:
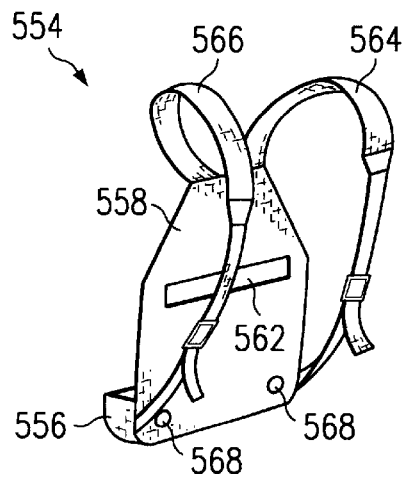

FIGS. 28a and 28b illustrate a backpack adapter indicated generally at 554. The backpack adapter 554 includes a shallow shelf or pocket 556 of sufficient depth to receive a bottom of the battery pouch 540. A main panel 558 of the backpack 554 is provided with a pair of snaps or other fastening units, in the illustrated embodiment the female half of a pair of snaps 560. The snaps 560 are disposed by a predetermined distance below a horizontally disposed slot 562. A pair of preferably padded shoulder straps 564 and 566 are joined at a top margin 568 of the panel 558 and at a bottom thereof. Conveniently, the straps 564 and 566 may be made to be adjustable. On the front surface of the panel 558, as best shown in FIG. 28b, a pair of male snaps 568 is positioned by a predetermined distance below the slot 562.

Figure 29A:
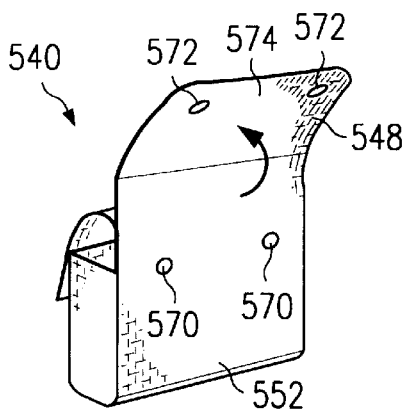
FIG. 29a is a front perspective view of the battery pouch shown in FIGS. 27a–b, showing a first stage in its combination with the backpack adapter shown in FIGS. 28a–b.
Figure 29B:
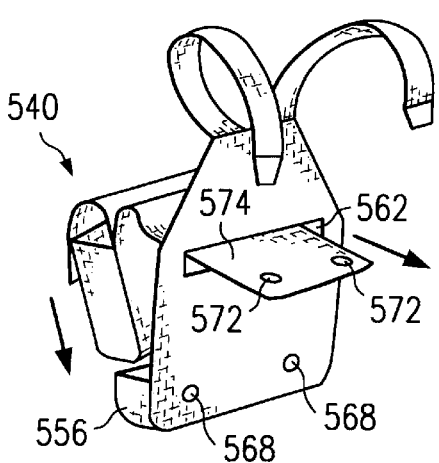
FIG. 29b is a perspective view of the battery pouch and backpack adapter shown in FIGS. 27a–b and FIGS. 28a–b, showing a second stage in their coassembly.
Figure 29C:
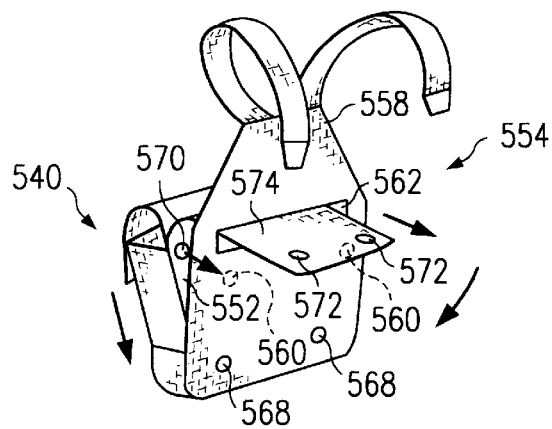
FIG. 29c is a perspective view of the battery pouch and backpack adapter shown in FIGS. 27a–b and FIGS. 28a–b, showing a third stage in their coassembly.
Figure 29D:
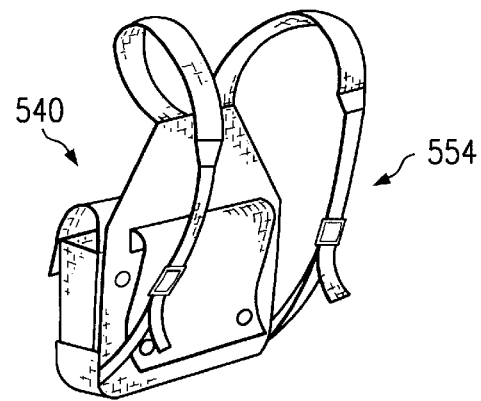
FIG. 29d is a perspective view of the battery pouch and backpack adapter shown in FIGS. 27a–b and FIGS. 28a–b, showing a final stage in their coassembly.

A first configuration of the battery pouch as used in conjunction with the battery pack 545 is shown in FIGS. 29a–29d. An end panel 574 of the belt loop 548 is unsnapped, separating male snaps 570 located in the rear panel 552 from female snaps 572 located in the flap 574. Next, as shown in FIG. 29b, the pouch 540 is inserted into the shallow pocket 556 and the end flap 574 of the battery pouch 540 is inserted through the slot 562. The male snaps 570 located in the rear panel 552 of the battery pouch 540 are snapped into place with the corresponding female snaps 560 located on the back side of the backpack main panel 558. To complete the assembly, the end flap 574 is folded down until its snaps 572 mate with the male snaps 568 on the front side of the main backpack panel 558. The backpack/battery pouch in its assembled "backpack" configuration is shown in FIG. 29d.

Figure 30A:
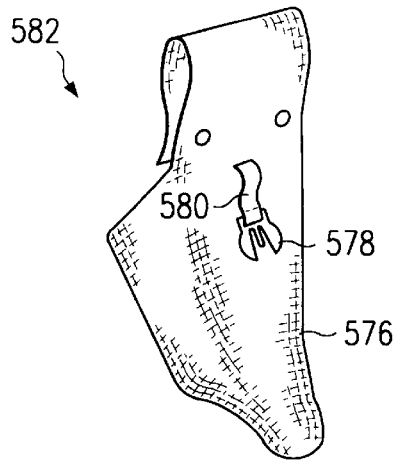
FIG. 30a is a rear perspective view of a hand tool holster forming a component of the present invention.
Figure 30B:
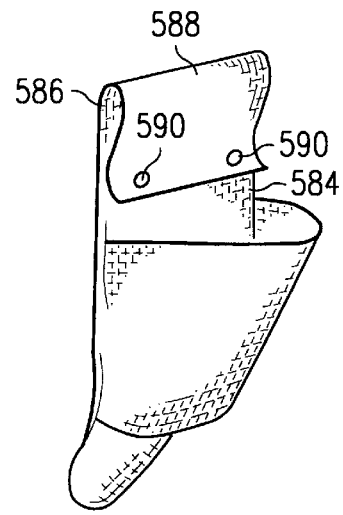
Figure 30C:
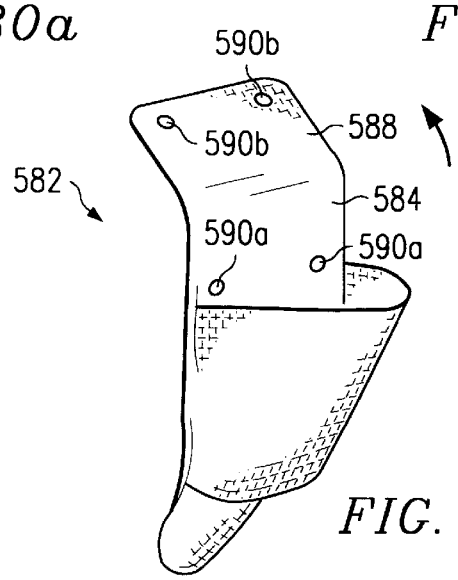
FIG. 30c is a perspective view of the holster shown in FIGS. 30a–b, showing a first stage of assembly of the holster into a "saddlebag" configuration.

FIGS. 30a–30c illustrate a holster indicated generally at 582 for use with a hand tool, such as a drill, according to the invention. The holster has an inner face 576 and one half, such as a male half, of a buckle or other fastener 578 as attached to a strap 580, the other end of which is attached to the inner face 576 of the holster 582. The holster has a main panel outer face 584 and a belt loop 586 including a flap 588 which is folded over and connected to the face 584 as by snaps 590. The illustrated holster 582 is shaped for a drill; the shape of holster 582 may be changed to fit other types of DC powered hand tools.

Figure 31A:
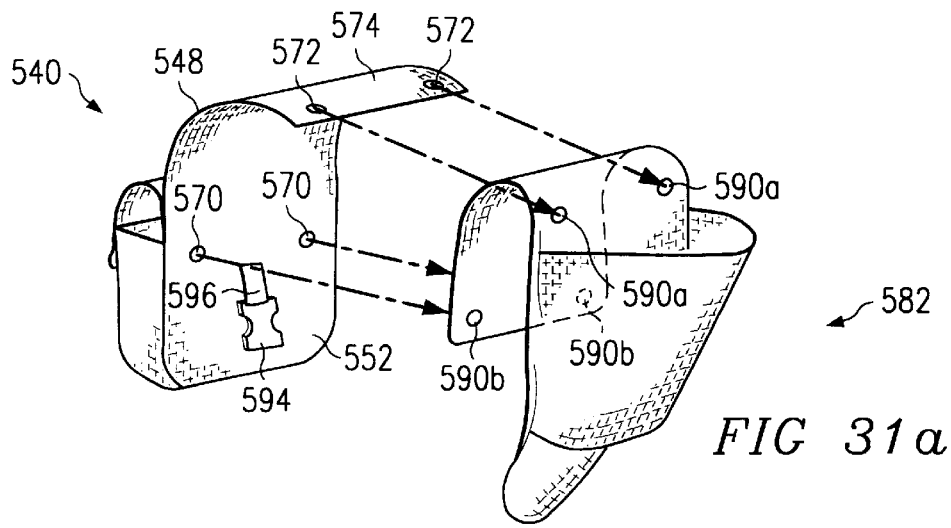
FIG. 31a is a perspective view of the holster shown in FIGS. 30a–b and the battery pouch shown in FIGS. 27a–b, showing a second stage in their coassembly to form the "saddlebag" configuration.
Figure 31B:
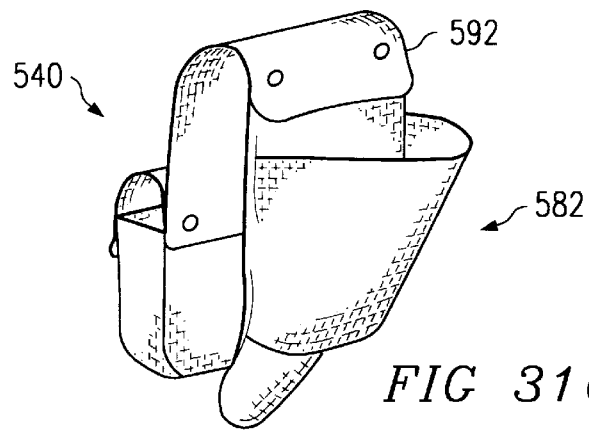
FIG. 31b is a perspective view of the holster shown in FIGS. 30a–b and the battery pouch shown in FIGS. 27a–b, showing a final stage of their coassembly to form the "saddlebag" configuration.

FIG. 30c shows a first step in reconfiguring the hand tool holster 582 according to this aspect of the invention. The flap 588 is unsnapped from the external face 584 by disengaging the snaps 590a and 590b. The panel 588 is then reversed and bent over in a U shape as shown in FIG. 31a. In this position, the snaps 590a are mated with the snaps 572 of pouch 540, and the snaps 590b are mated with the snaps 570 of pouch 540. The joining of the holster 582 to the pouch 540 creates a "saddlebag" as shown in FIG. 31b, in which the holster 582 and the pouch 540 are joined by an intervening web 592 of double thickness. The face 552 of the pouch 540 has a female half of a plastic buckle 594, as joined by a flexible strap member 596 to the face 552.

Figure 31C:
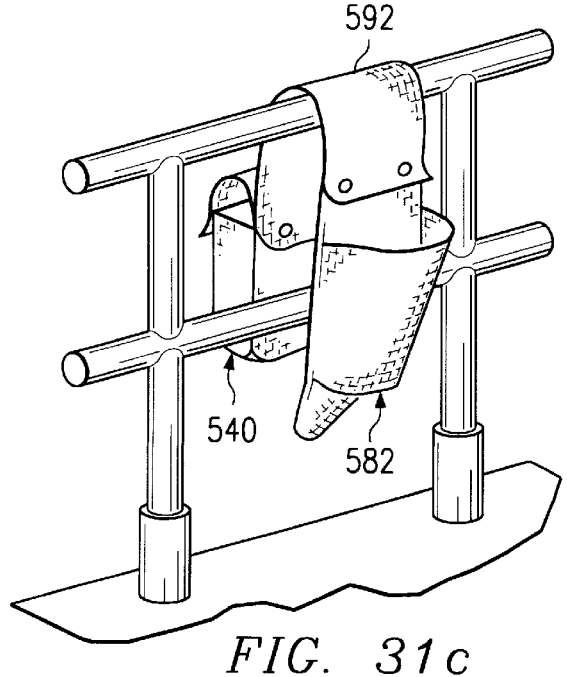
FIG. 31c is a perspective view of the assembled "saddlebag" installed on a railing.
Figure 31D:
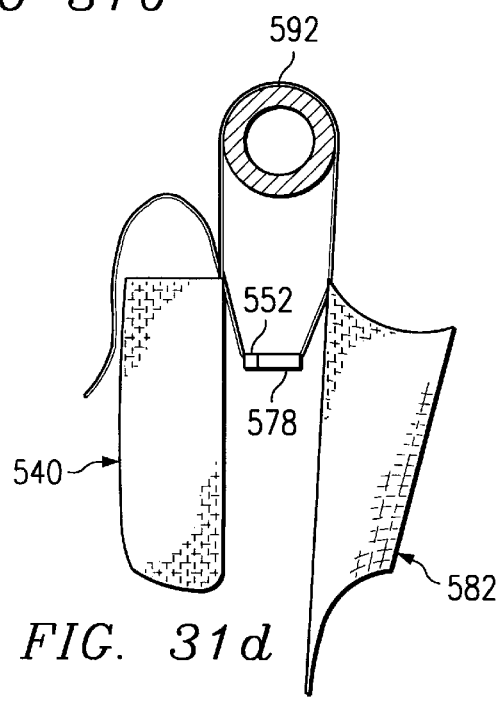
FIG. 31d is an end sectional view of the assembled "saddlebag", showing a method of securing the "saddlebag" to the railing.

The use of the pouch 540 and the holster 582 in the "saddlebag" configuration is shown in FIGS. 31c and 31d. Workers often find themselves in spots in which a rail R, or other horizontal member such as a ladder rung, is available. In this condition, it is possible for the operator of the hand tool to relieve himself or herself of the weight of the battery pack and of the hand tool by placing these in the "saddlebag" 540/582 and draping the web 592 thereof over the railing R. To make sure that the "saddlebag" does not slip off, the buckles 552 and 578 may be snapped together underneath the rail R, as shown in the sectional view of FIG. 31d. This aspect of the present invention provides a battery pouch 540 that can be configured into at least three configurations: one for wearing on a belt, one for wearing on the operator's back, and one for draping over a horizontal member such as a rail. This enhances the versatility and usefulness of the power system according to the invention. Of course, other fasteners besides the snaps and buckles shown can be used.

While the present invention has been described in the above detailed description and a plurality of embodiments thereof have been illustrated in the attached drawings, the present invention is not limited thereto but only by the scope and spirit of the claims which follow.

We claim:

1. A DC to DC converter for a handheld electrical device, comprising:
   a DC power input;
   a power conversion circuit coupled to said input for receiving power at a first voltage and having an output, said conversion circuit selectively gating power at a desired second voltage different from the first voltage to the output, the output adaptable to be coupled to a power input of the handheld electrical device;
   an output impedance element of the conversion circuit connected to the output, a logic circuit coupled to the output impedance element by a voltage sense line, a control path coupling the logic circuit to the conversion circuit, the logic circuit sensing a drop in voltage across the output impedance element as an indication that the handheld electrical device has been turned on by the user and that power is now required, the logic circuit, in response to sensing the drop in voltage, transmitting a control signal to the conversion circuit, the conversion circuit gating DC power at the second voltage responsive to receiving the control signal; and
   a trickle current path from the input of the conversion circuit to the output of the conversion circuit to permit a sense voltage to reside across the output impedance element when the electrical device is not turned on.

2. The converter of claim 1, wherein the trickle current path includes a resistor having an impedance which is relatively large relative to an impedance between the input and the output.

3. The converter of claim 1, wherein the conversion circuit converts DC power appearing at the input with a first voltage to a second DC power with a second voltage.

4. The converter of claim 3, wherein the first DC power is at a voltage higher than the voltage of the second DC power.

5. A handheld electrical device, comprising:

a remote power source supplying power at a first voltage;

a converter, a power conversion circuit of the converter having an input coupled to the remote power source by an electrical cord, the conversion circuit having an output, the conversion circuit selectively producing power at an output, the power produced at the output having a second voltage of a magnitude different from the first voltage, the output of the conversion circuit adaptable to be coupled to at least one functional electrical element of an electrical device by a power switch of the electrical device;

an output impedance element of the conversion circuit connected to the output, a logic circuit of the converter coupled to the output impedance element by a voltage sense line, a control path coupling the logic circuit to the conversion circuit, the logic circuit sensing a drop in voltage across the output impedance element when the switch is turned on, the logic circuit transmitting a control signal on the control path to the conversion circuit responsive to sensing the drop in voltage, the conversion circuit producing power at the output responsive to receiving the control signal; and a trickle current path coupled between the input and the output of the power conversion circuit to permit a current to pass through the output impedance element, thereby creating a sense voltage across the output impedance element when the electrical device power switch is not turned on.

6. The device of claim 5, wherein the switch is manually actuated.

7. The device of claim 5, wherein the electrical device is a power tool.

8. The device of claim 1, wherein the conversion circuit is a DC to DC power conversion circuit.

9. The device of claim 8, wherein the conversion circuit is a zero crossing buck converter.

10. The device of claim 8, wherein the conversion circuit incorporates a pulse width modulating integrated circuit.

11. A power supply system for a handheld electrical device, comprising:

a remote power source supplying power at a first voltage;

a converter, a power conversion circuit of the converter having an input coupled to the remote power source by an electrical cord, the conversion circuit having an output, the conversion circuit selectively producing power at an output, the power produced at the output having a second voltage of a magnitude different from the first voltage, the output of the conversion circuit adaptable to be coupled to at least one functional electrical element of an electrical device by a power switch of the electrical device;

at least one output impedance element of the conversion circuit connected to the output, a logic circuit of the converter coupled to the output impedance element by a voltage sense line, a control path coupling the logic circuit to the conversion circuit, the logic circuit sensing a drop in voltage across the output impedance element when the switch is turned on, the logic circuit transmitting a control signal on the control path to the conversion circuit responsive to sensing the drop in voltage, the conversion circuit producing power at the output responsive to receiving the control signal; and a trickle current path coupled between the input and the output of the power conversion circuit to permit a current to pass through the output impedance element, thereby creating a sense voltage across the output impedance element when the electrical device power switch is not turned on.

* * * * *